(12) United States Patent
Hassan et al.

(10) Patent No.: US 12,287,690 B2
(45) Date of Patent: Apr. 29, 2025

(54) POWER-PER-PROCESSING EVENT ESTIMATES BASED ON TOTAL POWER CONSUMPTION MEASUREMENTS WITHIN A DATA STORAGE DEVICE

(71) Applicant: Western Digital Technologies, Inc., San Jose, CA (US)

(72) Inventors: Yoseph Hassan, Nechusha (IL); Eran Sharon, Rishon Lezion (IL); Shay Benisty, Beer Sheva (IL); Ariel Navon, Revava (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/959,037

(22) Filed: Oct. 3, 2022

(65) Prior Publication Data

US 2024/0118736 A1    Apr. 11, 2024

(51) Int. Cl.
*G06F 1/3206*    (2019.01)

(52) U.S. Cl.
CPC .................................. *G06F 1/3206* (2013.01)

(58) Field of Classification Search
CPC ......................................................... G06F 1/32
See application file for complete search history.

(56) References Cited

U.S. PATENT DOCUMENTS 8,718,798 B2 *  5/2014  Bultman ........... H02J 13/00002
                                                          700/286
8,732,635 B2     5/2014  Lewis et al.
8,904,209 B2    12/2014  Davis et al.
(Continued)

FOREIGN PATENT DOCUMENTS

| CN | 112084089 A | 9/2020 |
| CN | 111914000 A | 11/2020 |
| CN | 114238060 A | 3/2022 |

OTHER PUBLICATIONS

Hsu, Ying-Feng et al., "Self-Aware Workload Forecasting in Data Center Power Prediction"; 18th IEEE/ACM International Symposium on Cluster, Cloud and Grid Computing (CCGRID); May 1-4, 2008; https://ieeexplore.ieee.org/document/8411036; 10 pages.

*Primary Examiner* — Phil K Nguyen
(74) *Attorney, Agent, or Firm* — LOZA & LOZA LLP; Gabriel Fitch

(57) ABSTRACT

Methods and apparatus for power management in data storage devices are provided. One such data storage device (DSD) includes a non-volatile memory (NVM), a set of hardware processing engines, and a power sensor to detect a total power consumption of the set of hardware processing engines. A processor is configured to determine a power-per-processing event value for each of the set of processing engines based on total power consumption measurements, then control delivery of power to the processing engines based on the power-per-processing event values in accordance with a power budget. In some examples, the DSD employs a least-squares procedure to estimate the power-per-processing event values so the values can be determined without needing to measure the individual power consumption of the processing engines. Exemplary processing engines include a Read engine, a Write engine, etc. A recursive least-squares update procedure is also described.

21 Claims, 14 Drawing Sheets

(56) References Cited

U.S. PATENT DOCUMENTS

| | | |
|---|---|---|
| 8,938,630 B2 | 1/2015 | Jeddeloh |
| 8,949,637 B2 | 2/2015 | Knight |
| 8,966,293 B1* | 2/2015 | Dutch ................... G06F 3/0653 |
| | | 713/323 |
| 9,977,487 B2 | 5/2018 | Choi et al. |
| 10,996,733 B2 | 5/2021 | Lee et al. |
| 11,016,545 B2 | 5/2021 | Yang et al. |
| 11,048,448 B2 | 6/2021 | Suzuki et al. |
| 11,244,242 B2 | 2/2022 | Prakash et al. |
| 11,307,778 B2 | 4/2022 | Klein |
| 11,847,327 B2 | 12/2023 | Palmer |
| 12,019,413 B2* | 6/2024 | Brophy ................. G06F 1/3253 |
| 2007/0266269 A1* | 11/2007 | Fuchikami ............ G06F 1/3203 |
| | | 713/322 |
| 2009/0016137 A1 | 1/2009 | Hur et al. |
| 2010/0275047 A1* | 10/2010 | Kaneko ................. G06F 1/3203 |
| | | 713/323 |
| 2014/0149760 A1* | 5/2014 | Drake ................... G06F 9/5094 |
| | | 713/320 |
| 2015/0185813 A1* | 7/2015 | Ping ..................... G06F 1/3268 |
| | | 713/323 |
| 2016/0012555 A1* | 1/2016 | Harada .................. G06Q 50/16 |
| | | 705/26.61 |
| 2016/0041762 A1* | 2/2016 | Kanno ................... G06F 3/0604 |
| | | 711/103 |
| 2017/0075611 A1* | 3/2017 | Choi ..................... G06F 3/0634 |
| 2018/0182452 A1 | 6/2018 | Lee |
| 2018/0196490 A1* | 7/2018 | Ail ....................... G06F 1/3287 |
| 2019/0065086 A1* | 2/2019 | Margetts ............. G06F 13/1668 |
| 2019/0384513 A1* | 12/2019 | Matsubara ............ G06F 3/0653 |
| 2021/0055776 A1* | 2/2021 | Parry ................... G06F 1/3275 |
| 2021/0303184 A1 | 9/2021 | Palmer |
| 2021/0359514 A1 | 11/2021 | Suzuki |
| 2022/0215273 A1 | 7/2022 | Sethi et al. |
| 2022/0398035 A1* | 12/2022 | Thokala ................ G06F 3/0619 |
| 2023/0058022 A1* | 2/2023 | Chung .................. G06F 3/0625 |
| 2023/0104672 A1* | 4/2023 | Nakamura .............. G06F 1/324 |
| | | 713/340 |
| 2024/0111438 A1 | 4/2024 | Navon et al. |

\* cited by examiner $$
\overset{300}{\searrow}\qquad \overset{304}{\searrow}\qquad \overset{302}{\searrow}
$$

$$
E \qquad\qquad Pe \qquad Pt
$$

$$
\begin{bmatrix}
1 & 1 & 0 & 0 & 0 & 1 \\
1 & 1 & 0 & 0 & 1 & 1 \\
1 & 0 & 1 & 0 & 0 & 1 \\
1 & 0 & 1 & 1 & 1 & 0 \\
1 & 1 & 1 & 0 & 1 & 0 \\
1 & 0 & 0 & 0 & 0 & 1 \\
1 & 1 & 0 & 1 & 0 & 1 \\
& & \vdots & & &
\end{bmatrix}
\begin{bmatrix}
Pe0 \\ Pe1 \\ Pe2 \\ Pe3 \\ Pe4 \\ Pe5 \\ Pe6 \\ \vdots
\end{bmatrix}
=
\begin{bmatrix}
.4 \\ .8 \\ .7 \\ .5 \\ .9 \\ .2 \\ .3 \\ \vdots
\end{bmatrix}
$$

*FIG. 3*

$$E_t = \begin{bmatrix} 1 & E_{01} & E_{02} & \ldots & E_{0m} \\ 1 & E_{11} & E_{12} & \ldots & E_{1m} \\ . & . & . & . & . \\ 1 & E_{n1} & E_{n2} & \ldots & E_{nm} \end{bmatrix}$$

400

Processing Engine/Device →

Time ↓

$$\begin{bmatrix} 1 & E_{01} & E_{02} & \ldots & E_{0m} \\ 1 & E_{11} & E_{12} & \ldots & E_{1m} \\ . & . & . & . & . \\ 1 & E_{n1} & E_{n2} & \ldots & E_{nm} \end{bmatrix} \begin{bmatrix} P_{e0} \\ P_{e1} \\ \ldots \\ P_{em} \end{bmatrix} = \begin{bmatrix} P_{t0} \\ P_{t1} \\ \ldots \\ P_{tn} \end{bmatrix}$$

402

Processing Engine/Device →

Time ↓

FIG. 4

POWER-PER-PROCESSING EVENT ESTIMATES BASED ON TOTAL POWER CONSUMPTION MEASUREMENTS WITHIN A DATA STORAGE DEVICE

FIELD

The subject matter described herein relates to data storage devices and controllers. More particularly, the subject matter relates, in some examples, to the management of power within data storage devices.

INTRODUCTION

In consumer electronics, solid state drives (SSDs) or other data storage devices (DSDs) incorporating non-volatile memories (NVMs) are often replacing or supplementing conventional rotating hard disk drives for mass storage. The non-volatile memories may include one or more flash memory devices, such as NAND flash memories. The NVMs may also include multiple NAND flash dies or chips that comprise the NVM. Within SSDs and other data storage devices, it is important to control power consumption to, e.g., maximize battery life and manage operating temperatures. Herein, methods and apparatus are provided to efficiently control power consumption within SSDs and other data storage devices.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a data storage that includes: a non-volatile memory (NVM); a plurality of hardware processing devices (e.g., processing engines) configured to process NVM data; a power sensor configured to measure a total power consumption of the plurality of hardware processing devices; and a processor configured to: determine a power-per-processing event value for each of the plurality of processing devices based on total power consumption values obtained from the power sensor, and control delivery of power to the plurality of processing devices based on the power-per-processing event values.

Another aspect of the disclosure provides a method for use by a data storage device including an NVM, a power sensor, and a plurality of processing devices (e.g., processing engines) configured to process NVM data. The method includes: measuring, using the power sensor, a plurality of total power consumption values, each representative of a total power consumed by the plurality of processing devices; determining a power-per-processing event value for each of the plurality of processing devices based on the plurality of total power consumption values, and controlling delivery of power to the plurality of processing devices based on the power-per-processing event values.

Yet another aspect of the disclosure provides an apparatus for use with non-volatile memory (NVM) and a plurality of processing devices (e.g., processing engines) configured to process NVM data. The apparatus includes: means for measuring a total power consumption of the plurality of hardware processing devices; means for determining a power-per-processing event value for each of the plurality of processing devices based on total power consumption values obtained from the means for measuring the total power consumption; and means for controlling delivery of power to the plurality of processing devices based on the power-per-processing event values.

BRIEF DESCRIPTION OF THE DRAWINGS

FIG. 3 illustrates an exemplary active events matrix along with a corresponding measured power vector and a power-per-processing event vector, in accordance with some aspects of the disclosure.

FIG. 4 illustrates general forms of the active events matrix, the measured power vector, and the power-per-processing event vector of FIG. 3, in accordance with some aspects of the disclosure.

DETAILED DESCRIPTION

Figure 1:
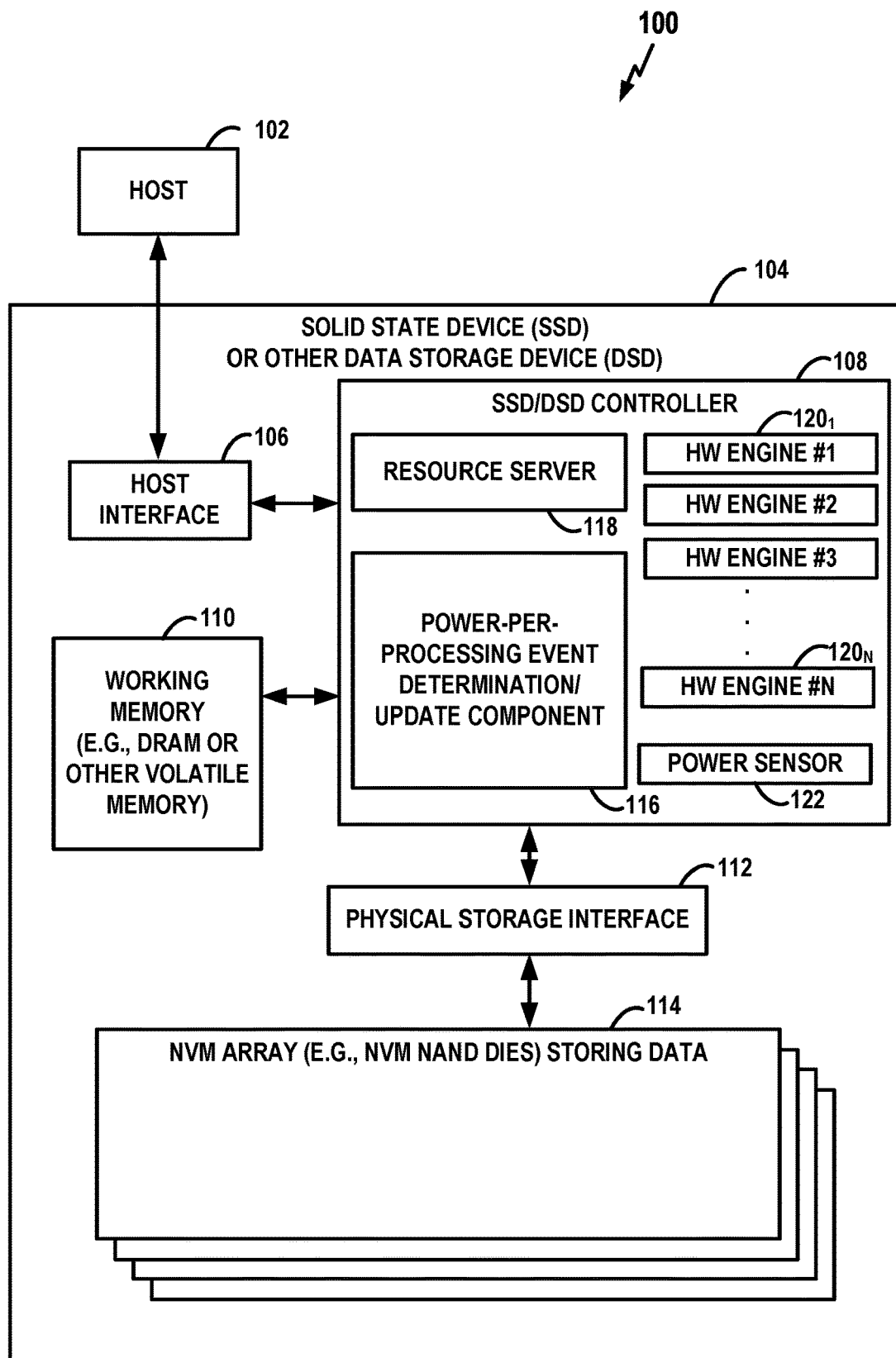
FIG. 1 is a schematic block diagram illustrating an exemplary data storage device (DSD) embodied as a solid-state device (SSD), including an SSD controller configured to determine individual power-per-processing event values based on total power consumption measurements from a power sensor, in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to data storage controllers of the DSDs. In the main examples described herein, data is stored within non-volatile memory (NVM) arrays. In other examples, data may be stored in hard disk drives (HDDs), tape drives, hybrid drives, etc. DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

As noted above, within DSDs, it is important to control power consumption to, for example, maximize battery life and manage operating temperatures. Generally speaking, the lower the power consumption, the longer the battery life and the lower the operating temperature. Nevertheless, at any given time and in any given processing state, the device often should abide by a strict power budget, which enables the device to utilize most of the available power so long as the power is below a power consumption budget such as a budget representative of a total amount of power that is available at any particular time. Deviating from the power budget may have critical effects on the device performance and compliance. For example, using more power than allowed or permitted by the power budget might cause the host power supply to fail and, as a result, impede (or cause failure in) memory device qualification tests. On the other hand, using less power than allowed or permitted might provide sub-optimal performance, and thus the device may appear to have lower performance and be less competitive in the marketplace. Hence, it is desirable to tune a DSD to utilize its power budget to the fullest without exceeding the budget.

In some examples, in order to determine a power budget for a new DSD, the overall power consumption of the device is measured in a lab during different operational modes (e.g., Idle, Read, Write and mixed loads), as well as in different power modes. Then, a lengthy and iterative characterization procedure is performed by engineers in which laborious estimates for the specific power consumption of different components/modules of the DSD are made by the engineers. Such characterization procedures often take a long time (usually weeks or months) and involve the work of several engineers. Moreover, the estimations might not be optimal. The estimates are then used to program the power control features of the DSD. Typically, once programmed, such features cannot be easily changed. That is, power control features of the DSD typically cannot be easily updated or tuned to utilize the full power budget of the DSD without exceeding the budget.

Aspects of the present disclosure relate to improved techniques for managing power in a data storage device. One aspect involves a data storage device such as an SSD that includes: an NVM, a set of hardware (HW) processing devices (which may also be referred to as processing engines) configured to perform operations (such as reading data from the NVM and writing data to the NVM), a power sensor configured to measure a total power consumption of the set of hardware processing devices, and a processor. The processor is configured to determine a power-per-processing event value for each of the set of processing devices and to control power delivered to the set of processing devices based on the power-per-processing events values. For example, the power allocated to the processing devices may be controlled based on a power control profile derived from the power-per-processing event values to control the total amount of power to efficiently exploit the power budget of the device to maximize performance while maintaining power consumption within a power budget. A common example is to postpone an engine operation if there is currently not enough power available for its full operation (based on a power estimation).

In some aspects, the processor is further configured to: store a set of total power consumption values measured at different times as a power measurement vector (Pt) and, for each of the total power consumption values, store corresponding indications (e.g., an active events list) of the particular processing devices in a corresponding row of a matrix (E), wherein a first column of the matrix (E) stores a value indicative of a baseline power. The processor then determines the power-per-processing event values by performing a least-squares procedure on the matrix (E) and the power measurement vector (Pt) to determine an estimated power consumption vector (Pe), wherein E·Pe=Pt, and wherein each value within the estimated power consumption vector (Pe) represents the estimated power consumption of a corresponding one of the processing devices/engines for a corresponding processing event.

In still other aspects, the processor is further configured to: update the estimated power consumption vector Pe by updating the power measurement vector Pt with an additional power measurement entry and performing an iterative or recursive least-squares procedure on the matrix E and the updated power measurement vector Pt to solve for an updated estimated power consumption vector Pe. The least-squares procedure may be referred to as an on-line least-squares (OLS) since the procedure may be performed by an SSD while the SSD is operating (as opposed to an off-line procedure that might otherwise performed in a lab).

In this manner, the lengthy characterization procedure summarized above that might otherwise take engineers weeks or months to complete can be avoided. Moreover, the power profile can be adaptively updated or tuned to respond to changes in the device, such as changes in operating temperatures, processes and/or voltages, so as to periodically and adaptively optimize power usage.

In some aspects, an initial off-line least-squares procedure may be performed in a lab to determine initial power-per-event values for storing in a DSD. Thereafter, the DSD may adaptively update the power-per-event values based on power usage data the DSD collects during operations using the iterative or recursive least-squares procedure.

In other aspects, the power-per-event values can be generated entirely on-line by the DSD itself based on power measurement data the DSD collects without requiring an initial off-line procedure prior to deployment and activation of the DSD.

Exemplary Devices, Systems and Procedures

FIG. 1 is a schematic block diagram of a system 100 that includes an exemplary DSD 104 embodied as an SSD (or other DSD, but for simplicity referred to as an SSD) including SSD controller 108 configured with a power-per-processing event determination/update component 116 for determining and/or updating power-per-processing event values measured within the SSD and a HW resource server 118 for controlling power usage of various HW processing engines or processing devices based on the power power-per-processing event values, in accordance with some aspects of the disclosure. (Herein, for generality and convenience, the terms "processing devices" and "processing engines" are used interchangeably.)

FIG. 1 also illustrates a set of HW processing engines or devices $120_1 \ldots 120_N$, which may be, for example, Read transfer engines, Write transfer engines, etc. The processing engines are typically specialized HW devices that perform particular processing operations on NVM data. Herein, the term NVM data refers to data for storage within the NVM, including data to be stored (programmed) on the NVM array 114 or data that has been read from the NVM array 114. Other examples of processing engines include a Program engine, a Sense engine, an Erase engine, a Decrypt engine, etc. The SSD controller 108 also includes a power sensor 122. As will be explained, the power-per-processing event determination/update component 116 may determine and/or adaptively update power-per-processing event values for each of the processing engines $120_1 \ldots 120_N$ based on total power consumption measurements provided by power sensor 122 to enable the resource sever 118 to control the power usage of the processing engines to maintain power usage within a current power budget.

The system 100 also includes a host 102 with the SSD 104 coupled to the host 102. The host 102 provides commands to the SSD 104 for transferring data between the host 102 and the SSD 104. For example, the host 102 may provide a write command to the SSD 104 for writing data to the SSD 104 (using a Write engine of the HW engines $120_1 \ldots 120_N$) or a read command to the SSD 104 for reading data from the SSD 104 (using a Read engine of the HW engines $120_1 \ldots 120_N$). The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples.

The SSD 104 includes a host interface 106, an SSD or DSD controller 108, a working memory 110 (such as dynamic random access memory (DRAM) or other volatile memory), a physical storage (PS) interface 112 (e.g., flash interface module (FIM)), and an NVM array 114 having one or more dies storing data. The host interface 106 is coupled to the controller 108 and facilitates communication between the host 102 and the controller 108. The controller 108 is coupled to the working memory 110 as well as to the NVM array 114 via the PS interface 112. The host interface 106 may be any suitable communication interface, such as a NVM express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. The NVM array 114 may include multiple dies.

In some examples, the host 102 may be a laptop computer with an internal SSD and a user of the laptop may wish to playback video stored by the SSD. In another example, the host again may be a laptop computer, but the video is stored by a remote server.

Although, in the example illustrated in FIG. 1, the SSD 104 includes a single channel between controller 108 and NVM array 114 via PS interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to working memory 110 for performing the various functions effected by the controller and to maintain and manage cached information stored in the working memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

In some aspects, the power-per-processing event determination/update component 116 may be a separate component from the SSD controller 108 and may be implemented using any combination of hardware, software, and firmware (e.g., like the implementation options described above for SSD controller 108) that can perform the power-per-processing event determination/update operations as will be described in further detail below.

The working memory 110 may be any suitable memory, computing device, or system capable of storing data. For example, working memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be a cache memory. The NVM array 114 receives data from the controller 108 via the PS interface 112 and stores the data. In some embodiments, working memory 110 may be replaced by a non-volatile memory such as MRAM, PCM, ReRAM, etc. to serve as a working memory for the overall device.

The NVM array 114 may be implemented using NAND flash memory. In one aspect, the NVM array 114 may be implemented using any combination of NAND flash, PCM arrays, MRAM arrays, and/or ReRAM.

The PS interface 112 provides an interface to the NVM array 114. For example, in the case where the NVM array 114 is implemented using NAND flash memory, the PS interface 112 may be a flash interface module. In one aspect, the PS interface 112 may be implemented as a component of the SSD controller 108.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 108 may be a controller in another type of device and still be configured to perform or control power management, and perform some or all of the other functions described herein.

Figure 2:
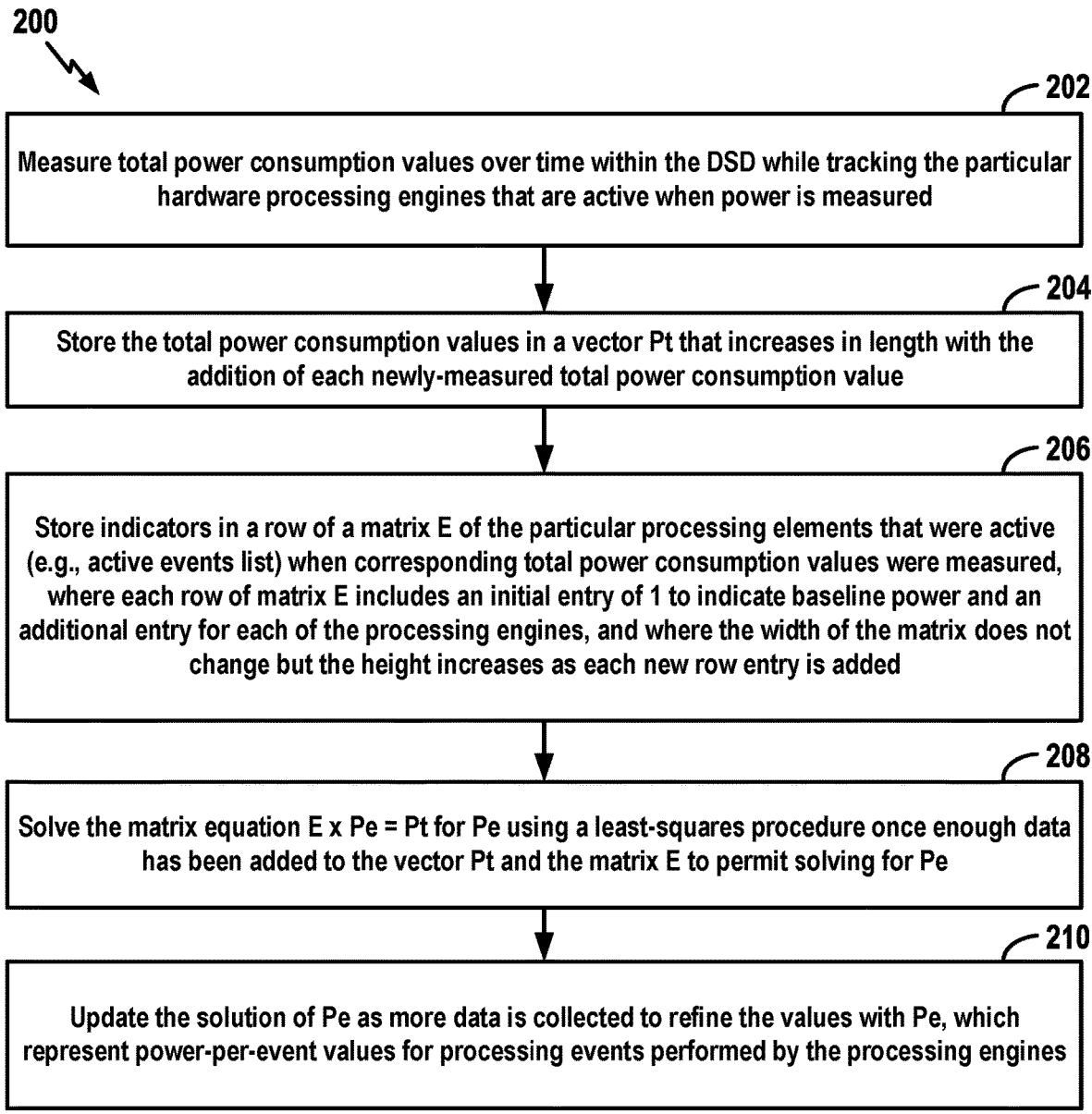
FIG. 2 is a flow diagram illustrating an exemplary method for determining power-per-processing event values based on total power consumption measurements, in accordance with some aspects of the disclosure.

FIG. 2 is a flow diagram 200 that illustrates an exemplary method for determining power-per-processing event values for processing events (e.g., Reads or Writes) performed by a set of hardware processing engines, where each power-per-processing event value represents the power consumed by a particular processing engine to perform its operation (i.e., to complete a processing event). For example, the power-per-processing event for the Read engine is the total power consumed by the Read engine while performing a Read operation. As another example, the power-per-processing event value for an Encrypt engine is the total power consumed by the Encrypt engine while performing an encryption operation.

The method of FIG. 2 operates to determine an estimated power consumption vector Pe, wherein each value within the vector Pe represents the estimated power-per-processing event for a corresponding one of the processing engine types. Hence, if there are ten processing engine types, the vector Pe will have ten values with each value indicating the number of active engines of the same type. Exemplary types of processing engines include but are not limited to: Write transfer; Read transfer; Program Single-Level Cell (SLC)/Multi-Level Cell (MLC)/Tri-Level Cell (TLC)/Quad-Level Cell (QLC) (1/2/3/4 Bits Per Cell); Sense SLC/MLC/TLC/QLC (1/2/3/4 Bits Per Cell); Fast Sense (e.g., a separate high speed sense circuit); Erase; error correction coding (ECC) Encode; ECC Decode (e.g., with different modes or "gears"); Encryption; Decryption; DDR interface; HMB (host memory buffer) functions; DSP (digital signal processing) functions including DSP functions with various different bit error estimation scan modes (BES)). Each is given a numerical designator, e.g., Encode Write Transfer=0, Read Transfers=1, etc. Each engine has a corresponding function or operation, e.g., a Write transfer operation, a Read transfer operation, etc.

At 202, a processor (e.g., the power-per-processing event determination/update component 116 of FIG. 1) measures total power consumption Pt within the DSD (or within a part of the DSD that includes all of the processing engines) using a power sensor (e.g., power sensor 122 of FIG. 1) while tracking the hardware processing engines that are active. For example, the processor may obtain a current active events list from a resource server (e.g., resource server 118 of FIG. 1) that lists all of the processing engines active when the total power consumption was measured. The total power consumption Pt represents the power consumed by all currently-active processing engines as well as a baseline power that is consumed even when none of the processing engines is active. Thus, in an example, an active events list and the corresponding total power consumption are obtained periodically. In other examples, the active events list may be obtained whenever a new processing event is initiated or when one is completed or at other times when the processor is triggered to obtain the active events list.

At 204, the processor stores the measured total power consumption values in a vector Pt (or other suitable data storage array) in memory. Hence, in the example where power is measured periodically, a new Pt value is added into the vector Pt periodically. The vector Pt thus increases in length with the addition of each new measured Pt power value. Each new entry in the Pt vector may be denoted $Pt_0$, $Pt_1$, $Pt_2$, etc.

At 206, the processor stores indicators in a row of a matrix E of the particular processing elements that were active (e.g., an active events list) when corresponding total power consumption values Pt were measured. Each row of matrix E (see, for example, FIG. 3, discussed below) includes an initial column entry of 1 to indicate baseline power and an additional column entry for each of the processing engines. The width (i.e., the number of columns) of the matrix E does not change over time but the height (i.e., the number of rows) of the matrix E increases as each new row entry is added. Thus, each row of the matrix E includes (in addition to its initial 1) a column entry for storing an indicator to indicate whether each particular type of processing engine is active and, if so, how many of the particular type are active. If none are active, a value of 0 is stored in the corresponding entry in the matrix, if one is active, a 1 is stored, if two are active, a 2 is stored, etc.

At 208, the processor solves the matrix equation E·Pe=Pt for Pe using a least-squares procedure once enough data has been added to the vector Pt and the matrix E to permit solving for Pe. Pe is a vector representing power-per-processing event values Pe for processing events performed by the various processing engines. For example, the first entry in Pe (Pe0) represents a baseline power, the second entry (Pe1) represents the power-per-processing event for the 1st processing engine type (e.g., the Encode TLC engine), the second entry in Pe (Pe2) represents the power-per-processing event for the $2_{nd}$ processing engine type (e.g., the Encode SLC engine), and so on. As least-squares methods are well known, the basic least-squares method used to initially solve for Pe will not be described herein in detail.

At 210, the processor updates the solution of Pe as more data is collected (i.e., more rows are added to E and Pt) to refine the values with Pe. A recursive or iterative least-squares method for updating Pe is described below. Initially, the estimate of Pe may be poor if there is relatively little data in the Pt vector and the E matrix when the least-squares method is initially applied. However, as more power measurements are recorded while different combinations of processing engines are operating, the estimate of Pe becomes more accurate to provide increasingly accurate estimates of the power consumed by each individual processing engine. Over time, hundreds of thousands or millions of power measurements may be made to provide accurate estimates of each of the power-per-processing element values and to permit changes in those values over time to be tracked (such as changes that may be due to changes in ambient temperature or changes due to the wear of the NVM die as it ages).

Note that in the example of FIG. 2, and in many of the other examples herein, the processing devices or engines are HW processing devices/engines. The HW devices or engines can include ASIC and internal Intellectual Property (IP) components, such as a Host Interface Module, a low-density parity check (LDPC) module, a DDR Controller, front end/back end (FE/BE) processors and a FIM as well as different NAND operations (e.g., Read and Write transfers, Erase, and so forth). However, in at least some examples, one or more of the processing devices/engines may be configured other than in hardware, such as in firmware.

FIG. 3 illustrates an exemplary matrix E 300 along with a corresponding Pt 302 vector containing the measured power values and a Pe vector 304, which represents the vector to be solved for. A first column in the matrix E consists of all is to represent baseline power. In this simplified example, there are five types of processing engines (hence, six total columns in matrix E) and there is only one instance of each type of engine. That is, there is only one Read transfer engine and only one Write transfer engine, etc. In the illustrative example of FIG. 3, when a first power value Pt was measured, the first and fifth processing engines were active but the others were not, and hence the first row of the matrix E includes [1,1,0,0,0,1]. When the second power value Pt was measured, the first, fourth, and fifth processing engines were active but the others were not, and hence the second row of the matrix E includes [1,1,0,0,1,1]. Additional entries are shown in matrix E where various different combinations of processing engines are active. Note that all of the processing engines are not active at the same time since, in this example, that would exceed the total power budget.

FIG. 3 additionally shows exemplary entries of the corresponding Pt 302 vector, which contains measured values for power. In this example, the exemplary power values are presented in arbitrary units and are scaled between 0 and 1. As shown, the first measured power value corresponding to the first row of matrix E was 0.4, the second measured power value corresponding to the second row of matrix E was 0.8, and so on.

FIG. 3 also shows the entries of the corresponding Pe 304 vector, which are the unknown values to be solved for. As noted, once there are a sufficient number of entries in matrix E and vector Pt, the processing system can solve for Pe. As more data is collected, the solution becomes increasingly overdetermined and least-squares procedures can be used to fit the Pe vector to the matrix E and vector Pt with increasing precision. In a practical example, millions of entries may be collected and, as will be explained below, efficient recursive techniques may be used to adjust previous estimates of the Pe vector as new data is collected.

Note that the computed values in the Pe vector represent the power consumed by each particular type of processing engine while it is operating. This data may then be used to control power delivery. Note also that this information is obtained without needing to measure the individual power consumed by each individual processing engine. Rather, at any given time, only total power consumption is measured. Still further, although in the example of FIG. 3 each entry in the matrix E is either 0 or 1, in other examples, the entries may be 2 or 3 or more, if more than one engine per type is active during a particular interval (such as two concurrent Read operations or two concurrent Write operations).

As shown in FIG. 4, in some examples, the matrix E is an active-HW-engines-matrix E 400 built based on the active-engines measurements (m HW engines, measured at n+1 points of time). Each HW-engine is represented as $E_{ij}$—were i represents the time index, and j represents the engine-index (e.g., Encode SLC=1, Encode TLC=2, Decode SLC= 3, . . . ). The value of $E_{ij}$ is equal to the number of active engines of type j at time point i. The vector $P_t$ of length n+1 contains the overall power measurements of the device along time.

As also shown in FIG. 4, in some examples, the relation between the power-per-processing event (i.e., the power-per HW-operation) and the total power can be written as an algebraic matrix expression 402, where Pe is the estimation of power-consumption of each processing event (HW-event) to be computed. That is, each value of Pe represents the power-per-processing event for a corresponding one of the HW processing engines/devices. Given n+1>m (formally, m<number of independent rows of E), a solution may be obtained using a least-squares method. Note that this method provides a closed form automatic technique to estimate the internal power consumption of each processing engine inside a memory-device. This estimation can be used by the resource server of the memory device to allocate and manage the power consumption. Since the method uses a systematic approach based on calculations, it can be used also during device characterization to accelerate time-to market, potentially this reducing time from weeks or months to hours. As noted, the method can also be performed on-line, i.e., by the DSD itself.

As noted, in some examples, power is measured periodically and so the time interval between two consecutive lines or rows of the matrix E is the same. In other examples, though, the time interval between two consecutive lines or rows of the matrix E may not be the same and can have variations. When using the procedure on-line in a DSD to estimate the power-per-processing event of different processing engines (e.g., the power consumed by, or associated with, a Read event or an Encrypt event), variations in the time intervals do not present a problem since the goal is to estimate power consumed per processing event and not power consumed per unit interval of time. The procedure operates to correlate power usage with processing events and, as more and more data is collected, any variations in timing intervals tend to average out. That is, it is sufficient that there is a correlation between measured power values and particular power engines operating when the power measurement is made. In examples where a power measurement is made at periodic time intervals, the power-per-unit time could be computed as well based on the time intervals.

Figure 5:
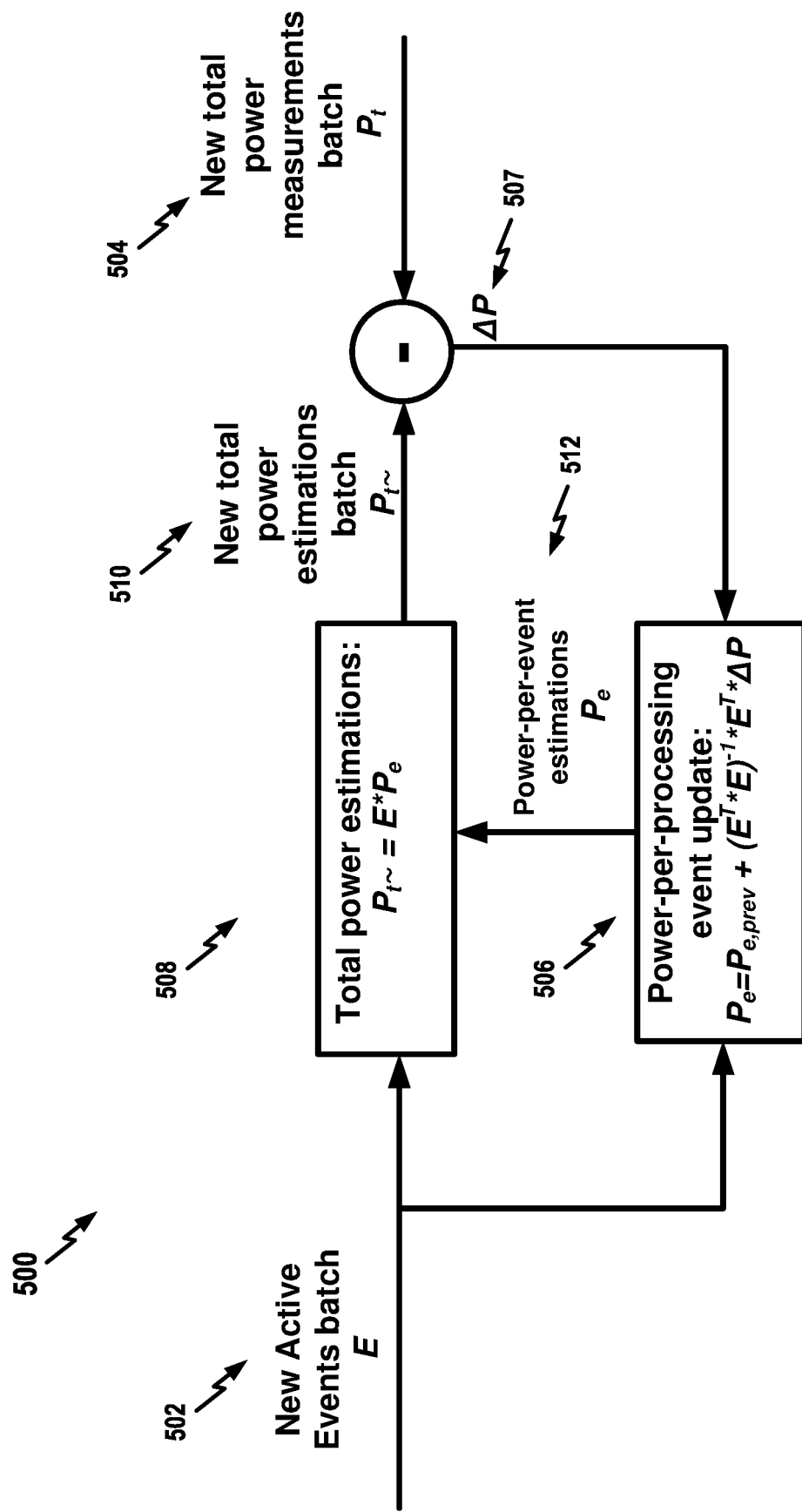
FIG. 5 illustrates a general form of a recursive or iterative least-squares procedure, in accordance with some aspects of the disclosure.

FIG. 5 illustrates a general form of a recursive or iterative least-squares procedure 500 for updating the Pe values based on new E values and new Pt values. A new batch 502 of active events E is input, which may be a matrix E that includes one or more new rows listing recently active (or recently completed) processing events. Concurrently, a new batch 504 of total power measurement values is input, which may be a vector Pt 504 that includes one or more new entries of total power measurements corresponding to the new active events in E.

E is applied to a power-per-processing event update formula 506, which also receives a ΔP vector 507 that represents the difference between the newly received Pt vector and the last previous $P_t$ vector 510 (denoted $P_t^-$). The formula of block 506:

$$P_e = P_{e,prev} + (E^T * E)^{-1} * E^T * \Delta P \quad \text{(Eq. 1)}$$

operates to update the last previous Pe vector (denoted $P_{e,prev}$) based on the new E and ΔP to yield a new updated $P_e$ vector 512.

The new updated $P_e$ vector 512 and the new E 502 are applied to the total power estimations formula in block 508:

$$P_t^- = E * P_e \quad \text{(Eq. 2)}$$

that generates a new total power estimations vector $P_t^-$ 510 that can be compared with yet another new $P_t$ 504 to determine yet another new value for ΔP 507 and so on. The procedure of FIG. 5 thus continuously or periodically updates the power-per-processing event estimations, each time a new batch of active events E and their corresponding total power estimation measurements $P_t$ are available.

A simple low-complexity variant, which operates on a single total power measurement and its corresponding active events vector and does not require any on-line matrix inversion and computation on large matrixes, will now be described. Assuming an initial Pe vector has been computed using Least-squares (where $P_e = P_{e0}, P_{e1}, \ldots, P_{em}$—representing the power-per-processing event for each of the m+1 engines), then each time i a new total power measure $P_{t\_i}$ and a set of corresponding active events vector $E_i$ is obtained, the device performs an update procedure for the elements in $P_e$ that were active in $E_i$:

$$P_{ej,new} = \alpha \cdot P_{ej,prev} + (1-\alpha) \cdot \frac{1}{E_{i,j}} \left( P_{t,i} - \sum_{jj \neq j} E_{i,jj} \cdot P_{ejj,prev} \right) \quad \text{(Eq. 3)}$$

In the equation, α is a configurable weight given each new sample (0<α<1) that can be set or optimized empirically (and potentially vary with time, e.g., a may be inversely proportional to the number of samples n that have been processed so far, thus as $P_e$ training progresses, its values become more stable and reduce the impact of new samples which may be noisy).

As an example, assume that only engines 1, 3, and 7 were active at time i (i.e., $E_i$=[1 0 1 0 0 0 1 0 . . . ]). Then, the processor computes new intermediate estimates:

$$P_{e1\_i} = P_{t\_i} - P_{e3} - P_{e7}$$

$$P_{e3\_i} = P_{t\_i} - P_{e1} - P_{e7}$$

$$P_{e7\_i} = P_{t\_i} - P_{e1} - P_{e3} \quad \text{(Eq. 4)}$$

Then the processor updates the relevant $P_e$ vector elements:

$$P_{e1} = \alpha \times P_{e1\_i} + (1-\alpha) \times P_{e1}$$

$$P_{e3} = \alpha \times P_{e3\_i} + (1-\alpha) \times P_{e3}$$

$$P_{e7} = \alpha \times P_{e7\_i} + (1-\alpha) \times P_{e7} \quad \text{(Eq. 5)}$$

where α is the configurable weight given to each new sample (0<α<1).

These $P_e$ update steps are sufficiently simple to implement in real-time either in a HW implementation or in firmware (FW). Note also that the operations can be implemented with thresholds so that only large changes in Pe values will be reported to the resource server. That is, unless a new Pe value differs by more than a threshold amount ΔX (e.g., 10% or 5% or some other threshold amount) from the previous corresponding Pe value, the previous Pe value is still used for power management. If the new Pe value differs by more than the threshold amount, the new Pe value is used in power management.

Figure 6:
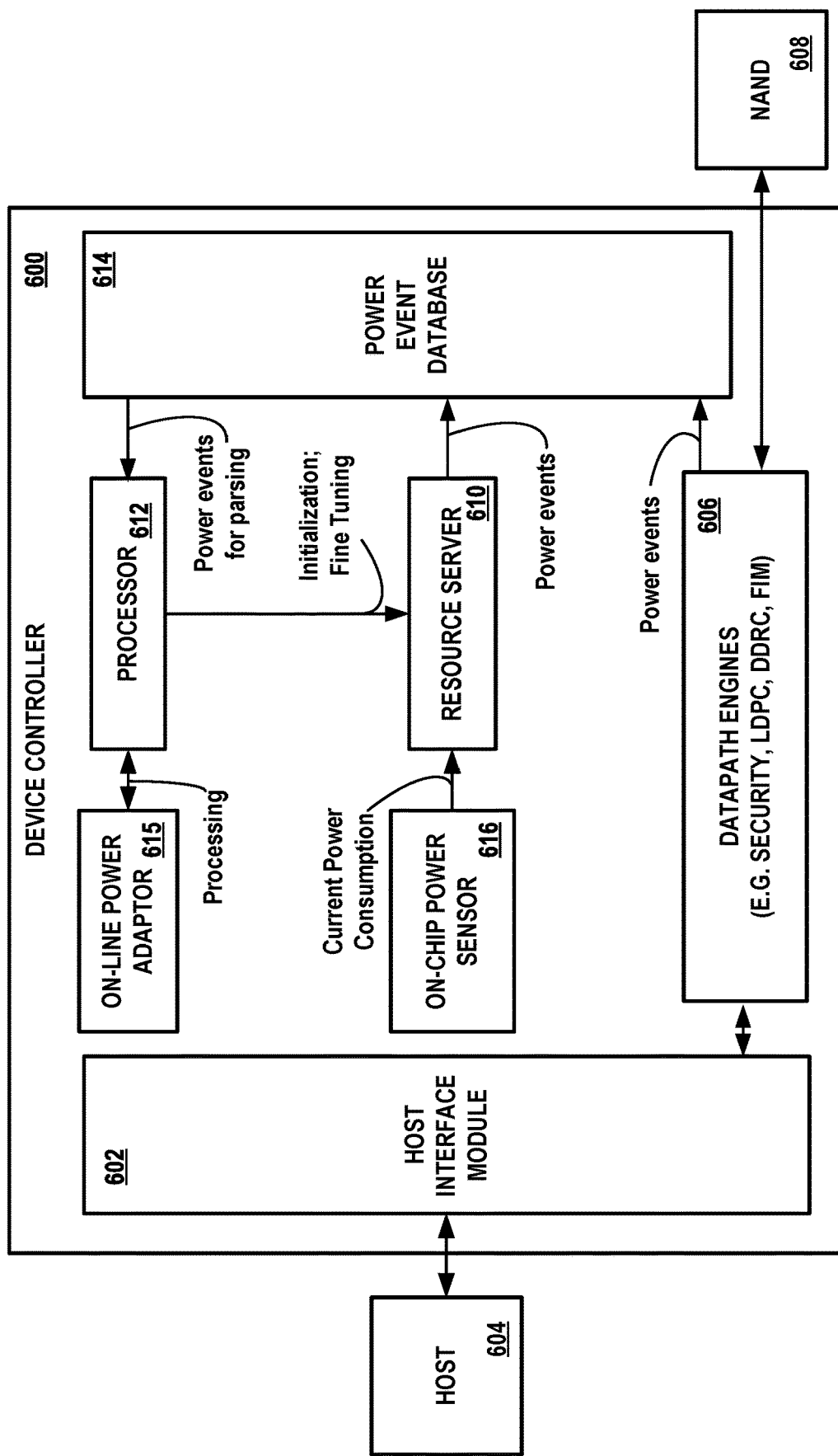
FIG. 6 illustrates selected features of a device controller, including a resource server and an on-line power adaptor, in accordance with some aspects of the disclosure.

FIG. 6 illustrates selected features of a device controller 600 (which may correspond to SSD controller 108 of FIG. 1). Controller 600 includes a host interface module 602 that interfaces with a host 604 for sending/receiving data and commands. A set of data path engines 606 route data between the host interface module 602 and a NAND 608 (or other NVM array). Exemplary data path engines 606 include a security engine, a LDPC engine, a DDR controller (DDRC), and a FIM. A resource server 610 manages the resources in the controller 600, including its power resources. A processor 612 configures the resource server 610 during an initialization phase, which may be based on initial off-line calibration data obtained in a lab. The resource server 610 along with the data-path engines 606 implemented in the system generate power related events. The events are stored in a Power Event datastore or database 614, which may be implemented with DDR. The power events may be stored in the form of the matrix E and power vectors Pe and Pt described above. Either the resource server 610 or the processor 612 receives notifications regarding the current consumed power from an on-chip power sensor 616. The processor 612 reads a list of processing events from the power event datastore or database 614 from time-to-time (e.g., periodically or when a processing event is completed or at other times when it is triggered to do so) and correlates (or parses) the processing events with consumed power as measured by the power sensor 616. That is, the processor 612 may perform the above-described procedures to compute power-per-processing event values Pe for each processing engine 606. An on-line power adaptor 615 may be configured to evaluate the results (e.g., detect changes in Pe values over time) and provide information to the processor 612 so that the processor 612 may reconfigure (e.g., fine tune) the resource server 610 to meet a power budget.

Figure 7:
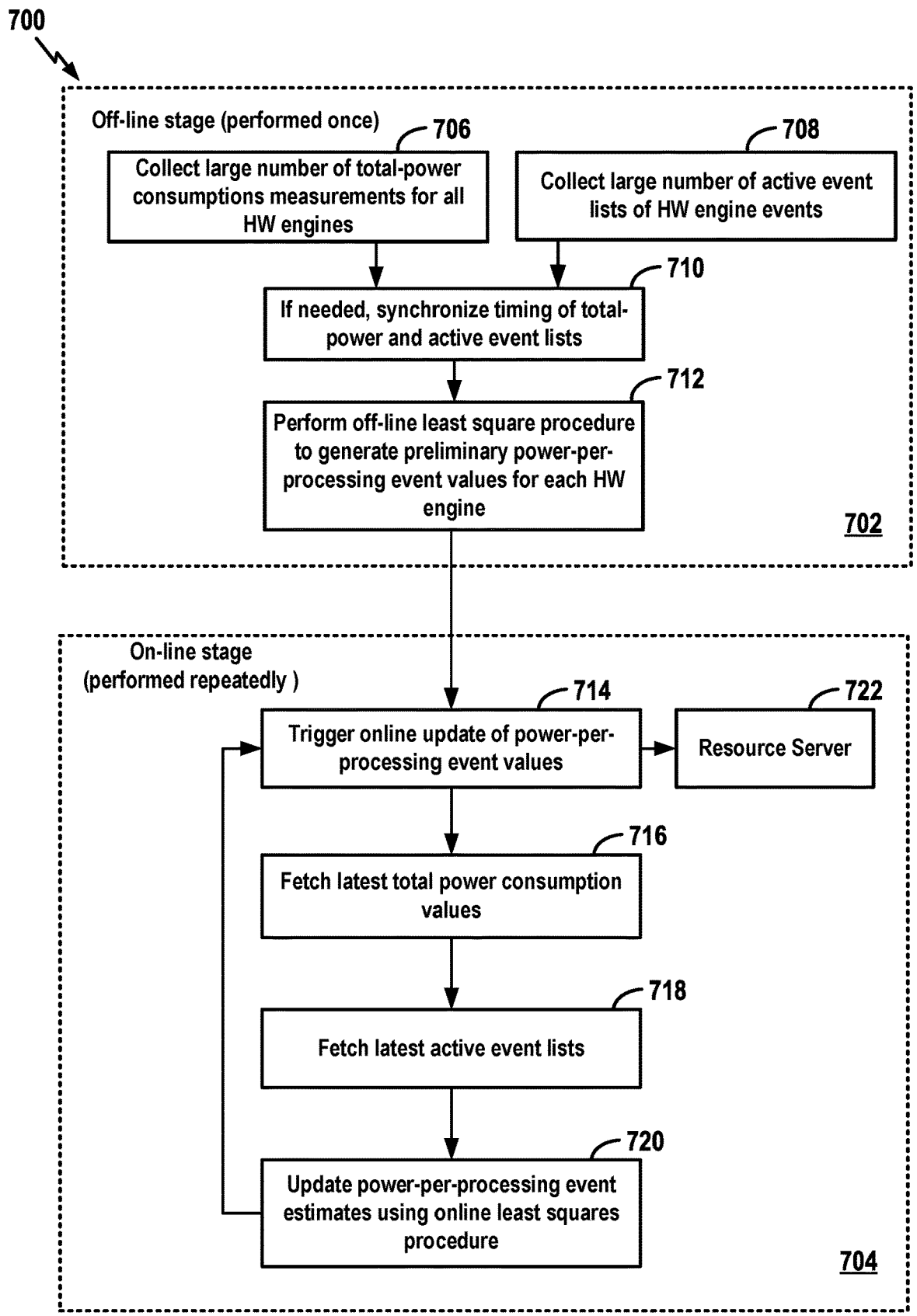
FIG. 7 is a flowchart summarizes an overall procedure for determining and updating power-per-processing event values, in accordance with some aspects of the disclosure.

FIG. 7 summarizes an overall procedure 700 that includes an initial off-line stage 702 that may be performed in a lab during device characterization and an on-line stage 704 that is performed by an SSD after it has been deployed to a user and is operating to store and process user data. Beginning at block 706, a test device (such as a test device in a device characterization lab) collects a large number of total power consumption measurements over a test interval, which may be over a period of minutes or hours. An on-board power sensor (as in FIG. 6) may be used to sense the power for output to the test device.

Concurrently at block 708, the test device collects a large number of corresponding active events, i.e., processing events or operations performed by the HW processing engines of the SSD while the power measurements are obtained. For example, the SSD may output lists of events to the test device. Note that, in some examples, the test device may perform operations (at block 710) to synchronize the timing of the total power measurements and the active events. This may be done, for example, by recording a time stamp along with each power measurement and recording a time stamp along with each active events list. The test device then synchronizes the power measurements with the active event lists using the time stamp information or other information.

At block 712, the test device performs an off-line least-squares procedure to generate an initial estimate of the power-per-processing event. For example, the test device may store the power measurements in a vector Pt and corresponding active event lists in a row of a matrix E (where each row in the matrix includes an initial 1 to represent baseline power, as discussed above), and then determine Pe from E·Pe=Pt. The resulting Pe values may then be stored in the SSD, which is deployed to a user.

At block 714, the SSD triggers the on-line power-per-processing event estimation procedure to update the power-per-processing event values. At block 716, the SSD fetches the latest total power measurement Pt measured by a power sensor in the SSD. At block 718, the SSD fetches the latest active event list (latest values for E) since the last trigger (e.g., fetched from the power event datastore or database shown in FIG. 6). At block 720, the SSD updates the power estimation using the recursive or iterative on-line least-squares procedure described above to update the values for Pe. Alternatively, although less efficient, the SSD may update the power estimation using the procedures of FIGS. 2-4 by: (a) adding an additional row to the current E matrix with each new active events list; (b) adding an additional entry to the current Pt vector with each corresponding total power measurement; and then (c) solving for Pe from E·Pe=Pt.

Processing then returns to block 714 to wait for a next trigger to again update the Pe values. Note that the update can be triggered at fixed times (i.e., periodically or in realtime) or may be triggered on some non-uniform time scale, such as on-demand by a host or as a result of some change in the SSD such as significant change in operating temperature. As also shown in FIG. 7, the latest updated Pe data is sent to the resource server 722 for use in controlling power usage to, e.g., keep the power within a current budget.

A significant advantage of applying on-line least-squares procedure is that instead of executing only the off-line onetime calculation based on all data collected off-line, the SSD updates the estimations for each extra collected data point, which involves only a minimal calculation cost. This "data point" includes a new power sample and the list of active events at this point of time. The SSD may be configured to check if the new point fits a current power model's estimation and then conditionally update it accordingly. Moreover, real-time updating is feasible (depending upon the processing capability of the SSD).

In some aspects, rather than performing the off-line stage 702 to determine the preliminary power-per-processing event values (Pe) and values for matrix (E) and vector (Pt), initial "dummy" values might be generated for populating at least one of E, Pe and/or Pt. For example, initial values may be randomly assigned and/or each processing device/engine might be given a unique binary indicator value. Over time, as more and more real data (i.e., new active event lists and corresponding power measurements) are collected by the SSD, the initial dummy values will have less and less of an influence on the estimates of power-per-processing event values so that the estimates will converge on the correct values. Hence, in some examples, the off-line stage 702 of FIG. 7 is not needed even when using the recursive update procedure.

Figure 8:
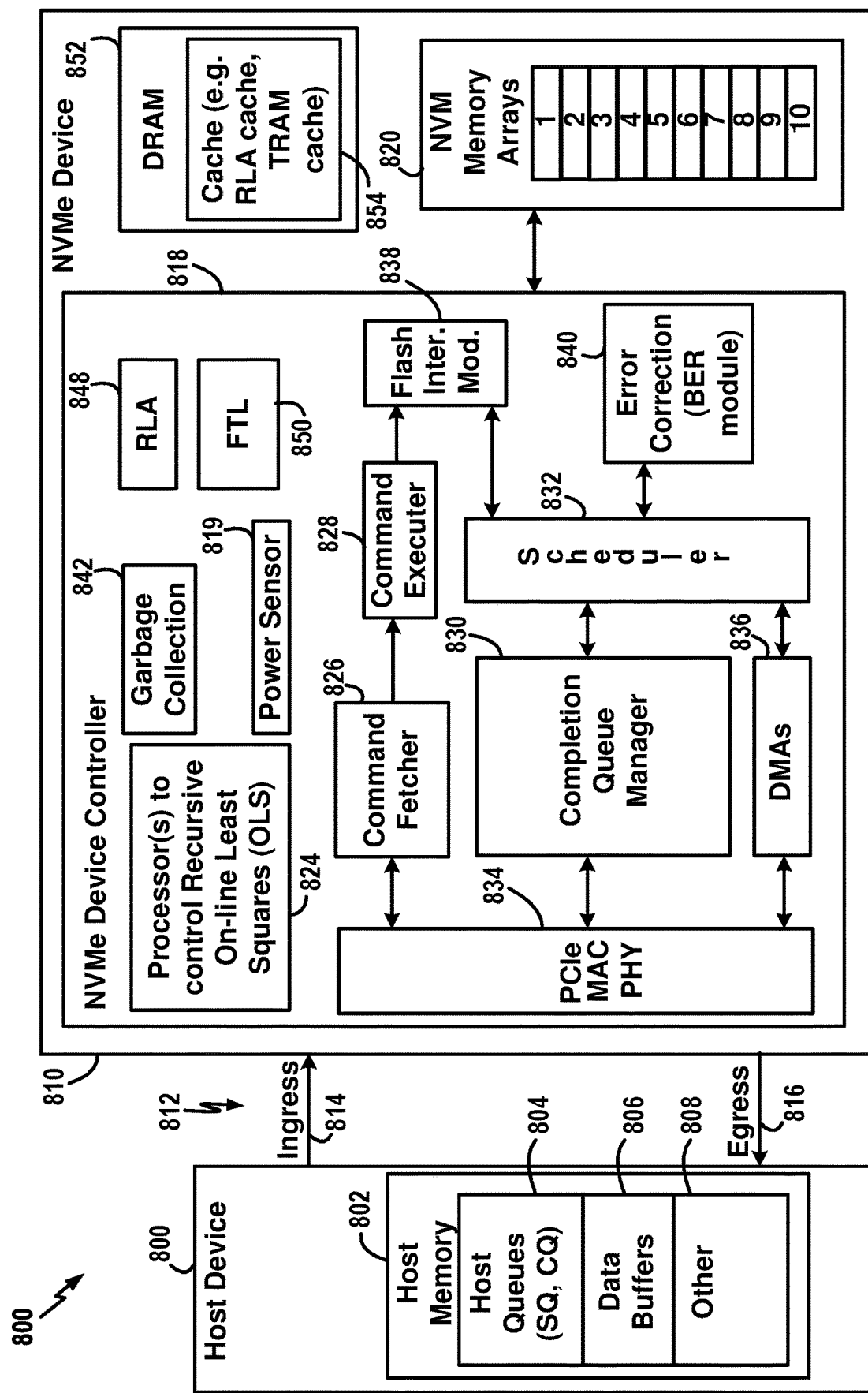
FIG. 8 is a schematic block diagram illustrating an exemplary data storage system with an NVM express (NVMe) device controller, the controller configured to determine and update power-per-processing event values, in accordance with some aspects of the disclosure.

FIG. 8 is a schematic block diagram illustrating an exemplary data storage system with an NVMe device controller 818, the controller configured to perform the above-described recursive or iterative least-squares procedure, in accordance with some aspects of the disclosure (or the non-iterative version of the procedure). The system includes a host device 800 that may be any suitable computing or processing platform capable of accessing memory on an NVM data storage device to write data using NVMe procedures. The host device 800 includes internal memory 802, which in this example is dynamic random-access memory (DRAM). The host memory 802 may be configured to include, as shown, various host submission queues (SQs) and completion queues (CQs) 804, data buffers 806 and other memory components 808. The host device 800 may store data in an NVMe storage device 810. The NVMe device 810 may be any suitable device that provides non-volatile memory storage for host device 800 in accordance with NVMe standards. For example, the NVMe device 810 may be a removable storage device, such as a flash SSD that is removably connectable to host device 800. In another example, the NVMe device 810 may be non-removable or integrated within the host device 800. In some embodiments, the host device 800 and the NVMe device 810 are communicatively connected via a PCIe bus 812 (including ingress 814 and egress 816).

The NVMe storage device 810 of FIG. 8 includes an NVMe controller 818 and a non-volatile memory 820. The NVMe controller 818 controls access to the non-volatile memory 820 such as a NAND. The NVMe controller 818 thus may be a non-volatile memory controller that implements or supports the NVMe protocol, and the non-volatile memory 820 may be implemented with two dimensional (2D) or three dimensional (3D) NAND flash memory. The NVMe controller includes one or more processors 824 configured to control/manage the recursive or iterative on-line least-squares (OLS) procedure. The processor(s) 824 are also responsible for the execution of other front-end and back-end tasks.

In operation, a command fetcher 826 of the NVMe controller 818 fetches commands, such as read requests for data, from the submission queues within the host memory 802 and forwards the commands to a command executer 828. The command fetcher 826 is responsible for fetching and parsing the commands from the host and queuing them internally, and may form part of a front end of the NVMe controller 818. The command executer 828 is responsible for arbitrating and executing the commands (and can include various processing devices/engines for executing the commands). Upon completion of the commands, the NVMe controller 818 generates completion entries that are ultimately directed to the completion queues within the host memory 802. A completion queue manager 830 is responsible for managing the host completion queues. Among other functions, the completion queue manager 830 routes completion entries received from a scheduler 832 to a completion queue within the host device 800 via a PCIe MAC PHY interface 834.

Actual streams of data (obtained as the result of read commands applied to the NVM memory arrays 820) are delivered to the host device 800 using one or more DMAs 836. Additional components of the NVMe controller 818 shown in FIG. 8 include a FIM 838, which is responsible for controlling and accessing the memory arrays 820, and an ECC component 840, which includes a bit error rate (BER) module. The BER module may represent another example of a processing device/engine.

Additional components of the NVMe controller 818 include: a garbage collection module 842 for controlling garbage collection and related tasks; a read look ahead (RLA) controller 848; and a flash translation layer (FTL) 850. Note that some of these components may be part of the flash interface module 838 but are shown separately for the sake of completeness and convenience. The NVMe storage device 810 may additionally include a DRAM 852 (or other working memory), which may include a cache 854.

In one aspect, the recursive or iterative OLS processor 824 can perform one or more of the actions of process 500 in FIG. 5 or the OLS stage 704 of FIG. 7. For example, in one aspect, the recursive or iterative OLS processor 824 may update power-per-processing event values based on measured total power consumption and active event lists based on total power consumption measurements made by a power sensor 819. In one aspect, the OLS processor 824 can be implemented as a single processor. In another aspect, the OLS processor 824 can be implemented with a main processor and a secondary processor (e.g., a physical storage or PS processor). The main processor can be directed to performing the general functions of the controller 818, while the PS processor can be directed to performing the functions (e.g., Reads and Writes) related to communication with the memory arrays 820.

In one aspect, the host 800 or the NVMe device 810 includes or acts as a resource server that allocates certain units of power for the device. The techniques described herein for saving power can help the device 810 comply with the power allocations set forth by the resource server. In one aspect, the active events lists may be generated by the command executer 828 and stored in DRAM 852.

Figure 9:
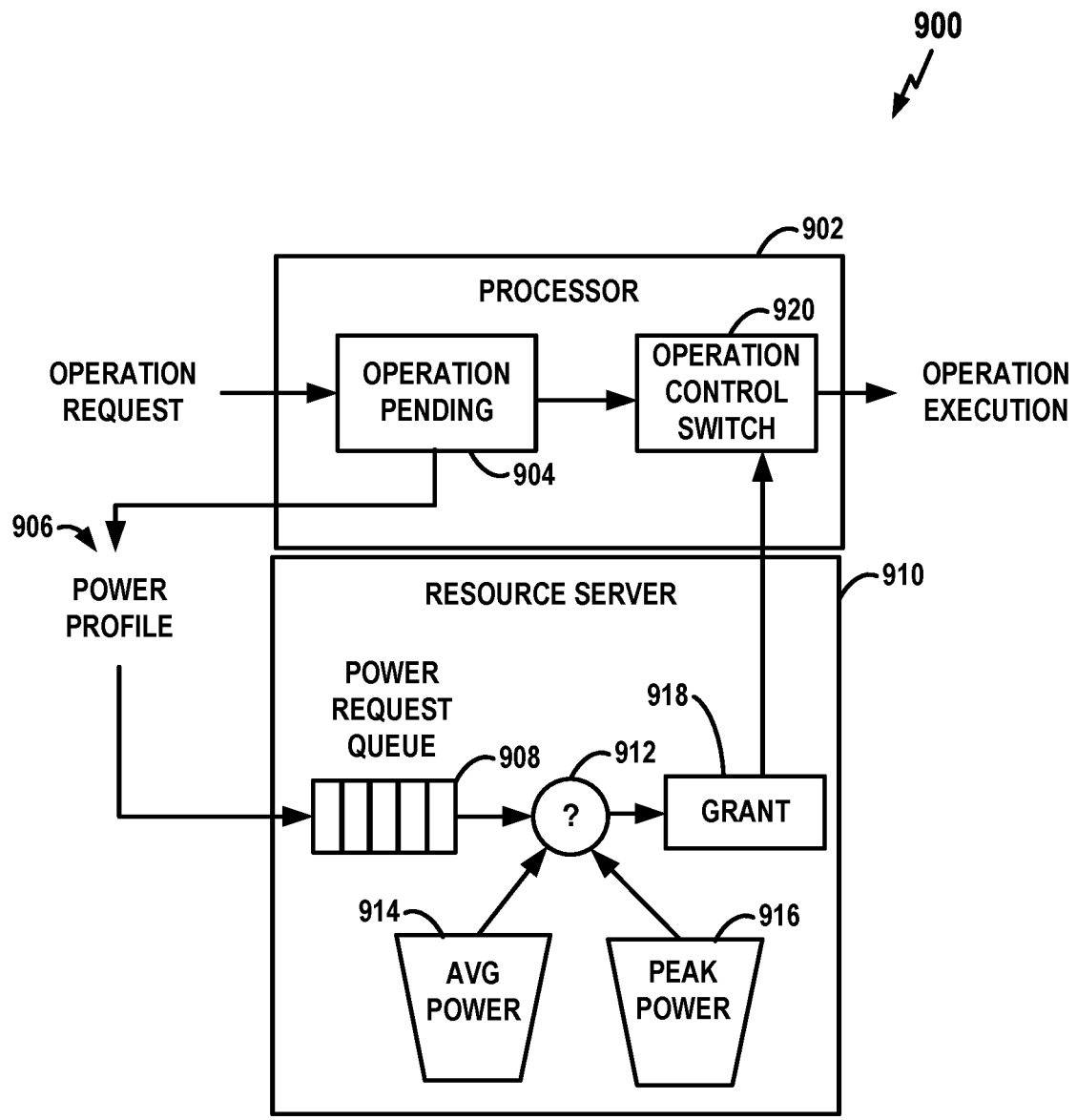
FIG. 9 is a schematic block diagram illustrating aspects of a power control/management system of an SSD, in accordance with some aspects of the disclosure.

FIG. 9 is a block diagram illustrating aspects of a power control/management system 900 of an SSD. A processor 902 receives an operation request (e.g., a Read transfer or a Write transfer operation from a host, which may be in the form of a Read or Write command) and saves the request as a pending operation 904. A power profile 906 is generated by the processor for the operation, which may specify the power-per-processing event value for the particular operation (which may also be referred to as a processing event). The power profile 906 is inserted into a power request queue 908 of a resource server 910, which may already have various operations in the queue 908. A decision component 912 of the resource server 910 determines whether the SSD has sufficient power to execute one or more entries in the queue based on average power information 914 and peak power information 916 of currently executing operations. If there is sufficient power to perform the operation without exceeding average and peak power limits (in accordance with a current power budget), the resource server grants the request by allocating the power and having a grant component 918 send a signal to an operation control switch 920 within the processor 902, which, in turn, forwards the operation to the appropriate HW device/engine for execution. Operation requests remain in the queue 908 until power can be allocated. The HW devices or engines can include ASICs, internal IP components, such as the Host Interface Module, LDPC, DDR Controller, FE/BE processors and FIM) of FIG. 8 as well as different NAND operations components (e.g., Read and Write transfers, Erase, and so forth).

In the following, various general exemplary procedures and systems are described.

Additional Exemplary Apparatus and Procedures

Figure 10:
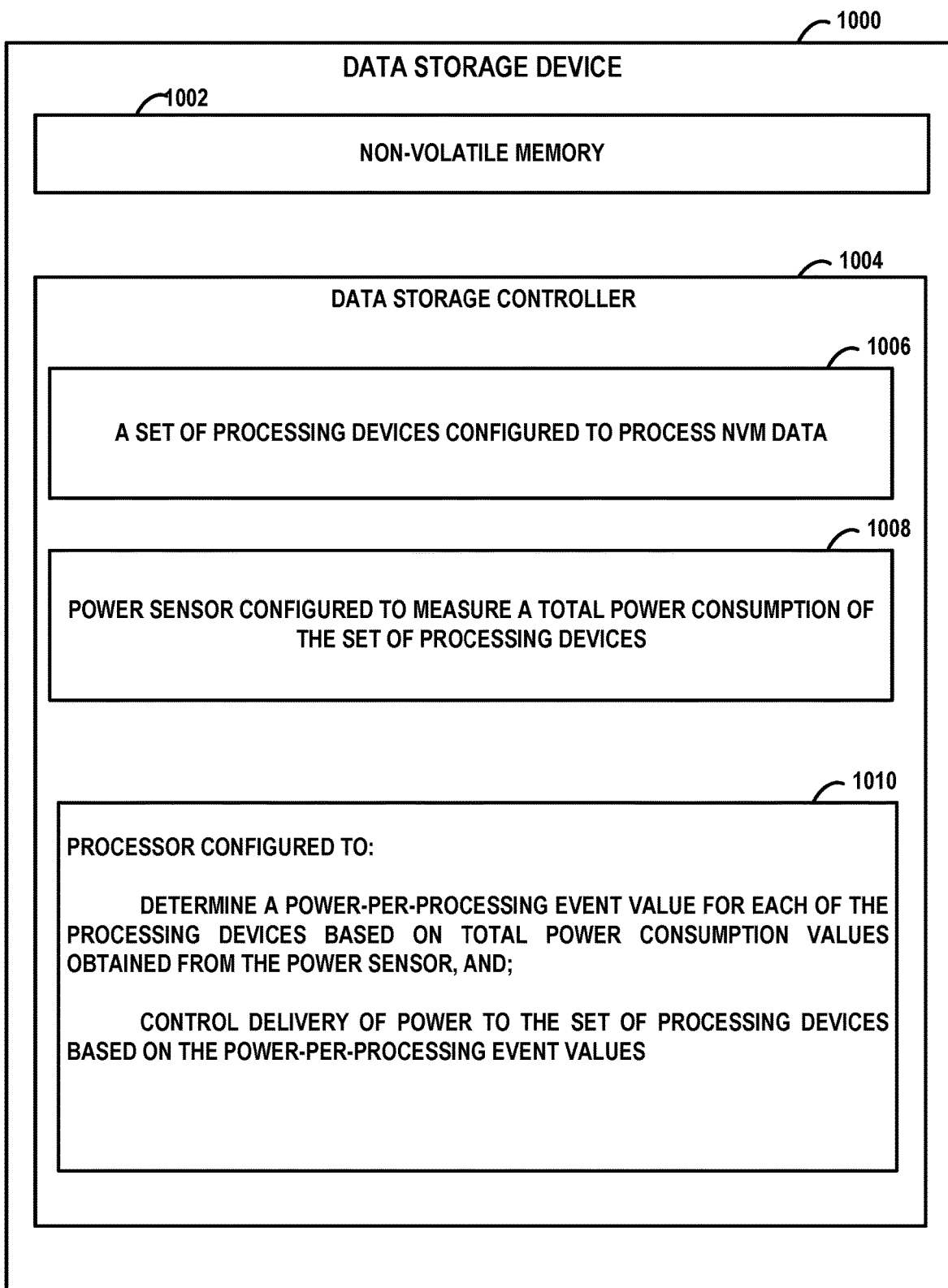
FIG. 10 is a schematic block diagram illustrating an exemplary data storage device configured in accordance with some aspects of the disclosure.

FIG. 10 broadly illustrates a data storage device 1000 configured according to one or more aspects of the disclosure. The data storage device 1000 includes an NVM 1002. In some aspects, the NVM 1002 stores data, such as user data obtained from a host. The data storage device 1000 also includes a data storage controller 1004. The data storage controller 1004 includes a set or plurality of processing devices or engines 1006 configured to process NVM data. For example, each may be configured to perform a processing operation or other processing event on NVM data. As noted above, NVM data refers to data for storage within an NVM, including data to be stored (programmed) on an NVM array or data that has been read from the NVM array. In some aspects, the processing devices are configured to perform different operations on data to be stored in or read from the NVM 1002, where each processing operation is a processing event. The data storage controller 1004 also includes a power sensor 1008 configured to measure a total power consumption of the set or plurality of processing devices 1006 and a processor or processing circuit 1010. The processor 1010 is configured to determine a power-per-processing event value for each of the set of processing devices 1006 based on total power consumption values obtained from the power sensor 1008 and control delivery of power to the set of processing devices 1006 based on the power-per-processing event values. The determination of the power-per-processing event value for each of the set or plurality of processing devices 1006 may be made using, e.g., the least-squares procedures described above in connection with FIGS. 2-5. In some aspects, some or all of the processing devices/engines 1006 and the processor 1010 are components of an integrated circuit, such as an ASIC. For example, the various processing devices/engines 1006 may be different circuits or modules within the integrated circuit and the processor 1010 may be another circuit or module within the same integrated circuit. See, for example, the circuits/modules of FIG. 14, described below. In other aspects, some or all of the processing devices/engines 1006 may be separate components formed on separate chips, such as separate ASICs, IPs, etc.

Figure 11:
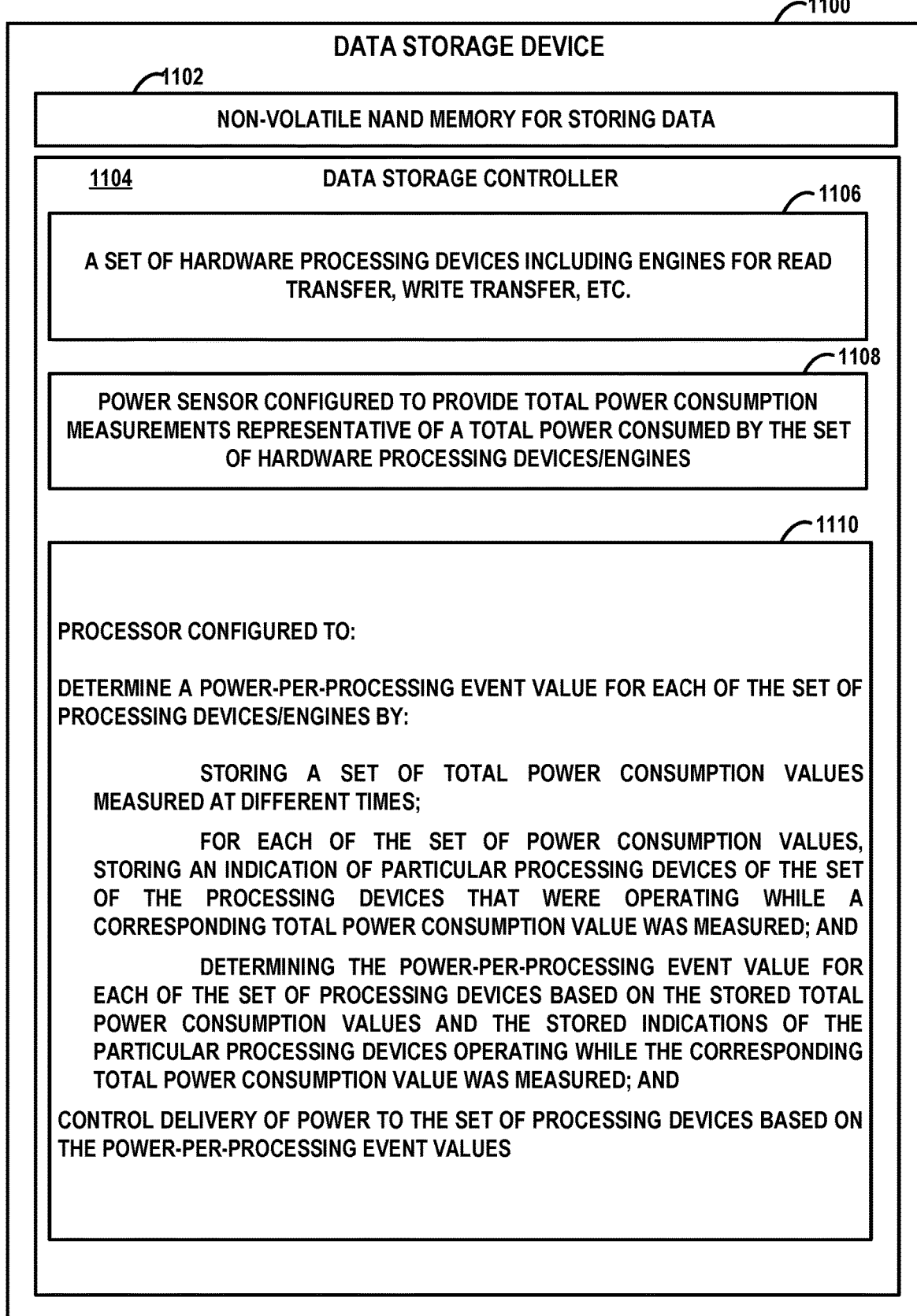
FIG. 11 is a schematic block diagram configuration for another exemplary data storage device configured in accordance with some aspects of the disclosure.

FIG. 11 broadly illustrates another data storage device 1100 configured according to one or more aspects of the disclosure. The data storage device 1100 includes an NVM NAND 1102 for storing data, such as user data obtained from a host, and a data storage controller 1104. The data storage controller 1104 includes a set (or plurality) 1106 of hardware processing devices that includes one or more of a Read transfer engine, a Write transfer engine, etc. (See above for a more complete list of exemplary device or engines.) Each HW engine or device is configured to perform operations on data, each processing operation being a processing event. Exemplary processing events or operations include one or more of a Read transfer operation, a Write transfer operation, etc. These operations may be initiated, e.g., based on commands received from a host.

The data storage controller 1104 also includes a power sensor 1108 (configured to provide total power consumption measurements representative of a total power consumed by the set of hardware processing devices 1106) and a processing circuit or processor 1110. The processor 1110 is configured to determine a power-per-processing event value for each of the set of processing devices 1106 based on the total power measurements obtained from the power sensor 1108 by: (a) storing a set of total power consumption values measured at different times; (b) for each of the set of power consumption values, storing an indication of particular processing devices of the set of the processing devices that were operating while a corresponding total power consumption value was measured; and (c) determining the power-per-processing event value for each of the set of processing devices based on the stored total power consumption values and the stored indications of the particular processing devices operating while the corresponding total power consumption value was measured. See, again, the least-squares procedures described above in connection with FIGS. 2-5.

The processor 1110 is configured to then control delivery of power to the set of processing devices 1106 based on the power-per-processing event values by, for example, using the systems and procedures of FIG. 9.

Figure 12:
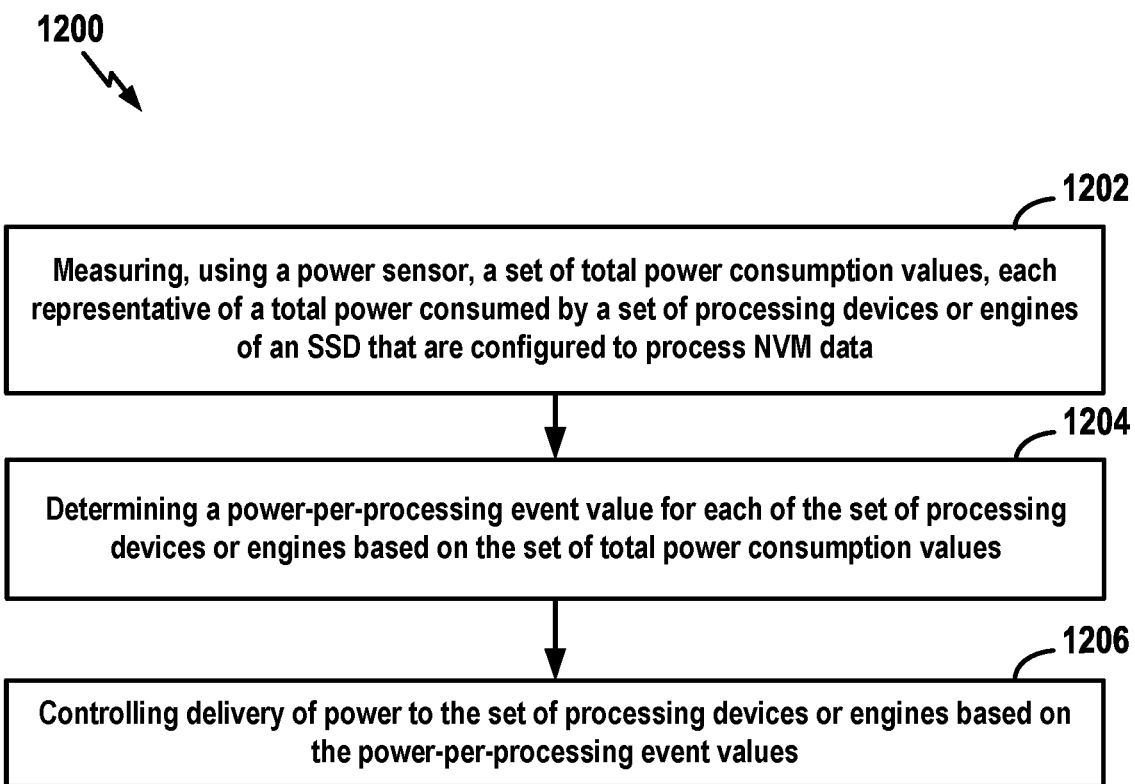
FIG. 12 is a flow chart of an exemplary method according to aspects of the present disclosure.

FIG. 12 illustrates a method or process 1200 in accordance with some aspects of the disclosure. The process 1200 may take place within any suitable data storage device or apparatus capable of performing the operations, such as an SSD configured with a power sensor and appropriate processing circuitry. See, for example, the devices of FIGS. 1, 6, and 8-10, described above, and FIG. 14, described below.

At block 1202, the data storage device measures (using a power sensor within the data storage device) a set or plurality of total power consumption values, each representative of a total power consumed by a set or plurality of processing devices or engines that are configured to process NVM data. The set of processing devices may include, e.g., one or more of a Read transfer engine, a Write transfer engine, etc. (See above for a more complete list of exemplary device or engines.) The HW engines may be configured to perform operations or other processing events including, e.g., one or more of a Read transfer operation, a Write transfer operation, etc.

At block 1204, the data storage device determines a power-per-processing event value for each of the set or plurality of processing devices or engines based on the set or plurality of total power consumption values. See, e.g., the on-line OLS procedures described above. In some examples, the power-per-processing event values correspond to one or more of a power-per-Read transfer event, a power-per-Write transfer event, etc.

At block 1206, the data storage device controls delivery of power to the set or plurality of processing devices or engines based on the power-per-processing event values to, e.g., maintain power within a power budget.

Figure 13:
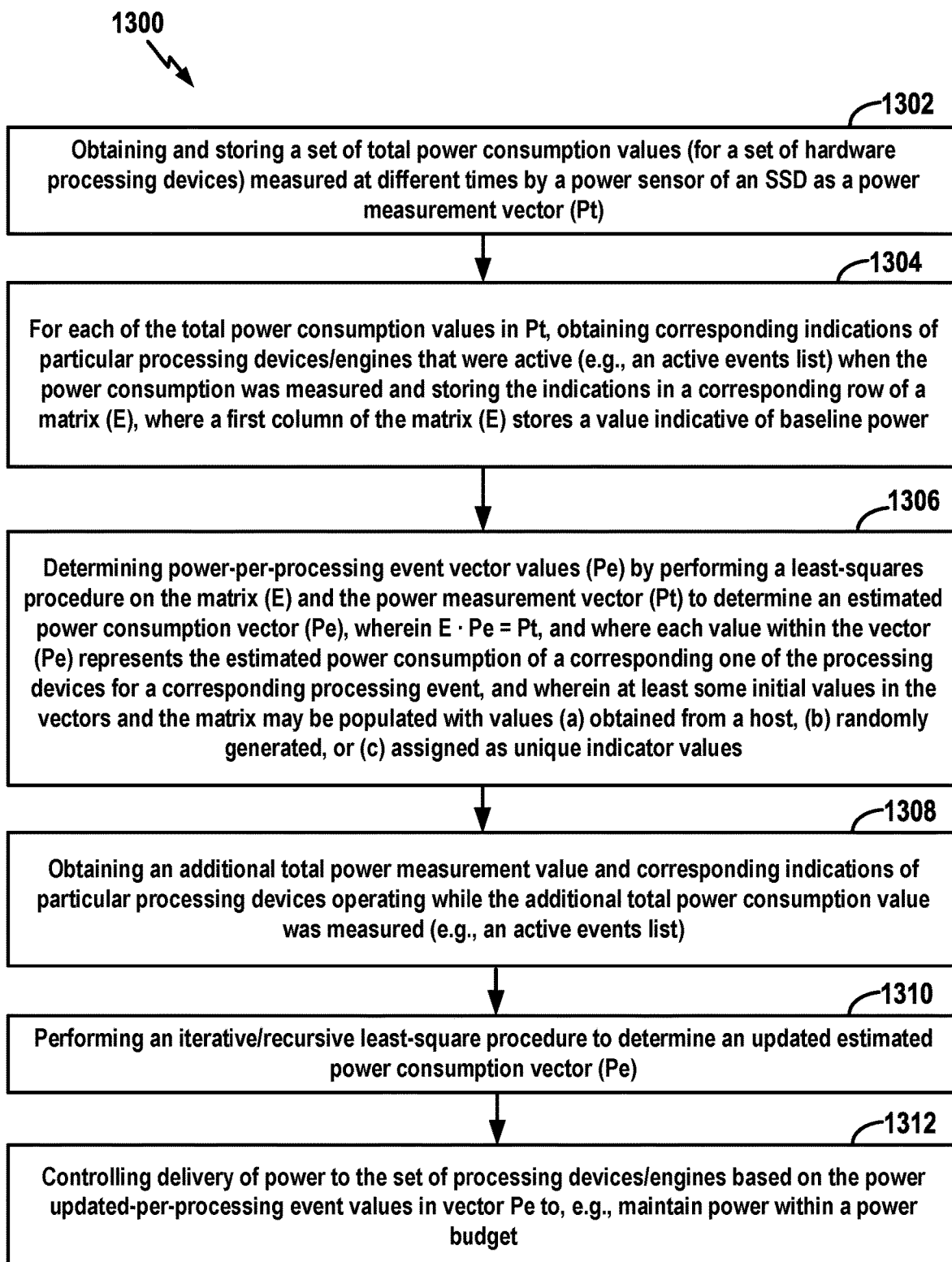
FIG. 13 is a flow chart of another exemplary method according to aspects of the present disclosure.

FIG. 13 illustrates a method or process 1300 in accordance with some other aspects of the disclosure. The process 1300 may take place within any suitable data storage device or apparatus capable of performing the operations, such as an SSD configured with a power sensor and appropriate processing circuitry. See, for example, the devices of FIGS. 1, 6, and 8-10, described above, and FIG. 14, described below.

At block 1302, the data storage device obtains and stores a set or plurality of total power consumption values (for a set of hardware processing devices) measured at different times by a power sensor of an SSD as a power measurement vector (Pt).

At block 1304, for each of the total power consumption values in Pt, the data storage device obtains corresponding indications of particular processing devices/engines that were active (e.g., an active events list) when the power consumption was measured and stores the indications (e.g., the active events list) in a corresponding row of a matrix (E), where a first column of the matrix (E) stores a value indicative of baseline power.

At block 1306, the data storage device determines power-per-processing event vector values (Pe) by performing a least-squares procedure on the matrix (E) and the power measurement vector (Pt) to determine an estimated power consumption vector (Pe), wherein E·Pe=Pt, where each value within the vector (Pe) represents the estimated power consumption of a corresponding one of the processing devices/engines for a corresponding processing event. In some aspects, at least some initial values in the vectors and the matrix may be (a) obtained from a host, (b) randomly generated, or (c) assigned as unique indicator values. (See, above, in the descriptions of the off-line stage 702 on FIG. 7.)

At block 1308, the data storage device obtains an additional total power measurement value Pe and corresponding indications of particular processing devices operating while the additional total power consumption value was measured (e.g., an updated active events list).

At block 1310, the data storage device performs an iterative/recursive least-square procedure to determine an updated estimated power consumption vector (Pe).

At block 1312, the data storage device may control delivery of power to the set of processing devices or engines based on the power updated-per-processing event values in Pe to, e.g., maintain power within a power budget.

Figure 14:
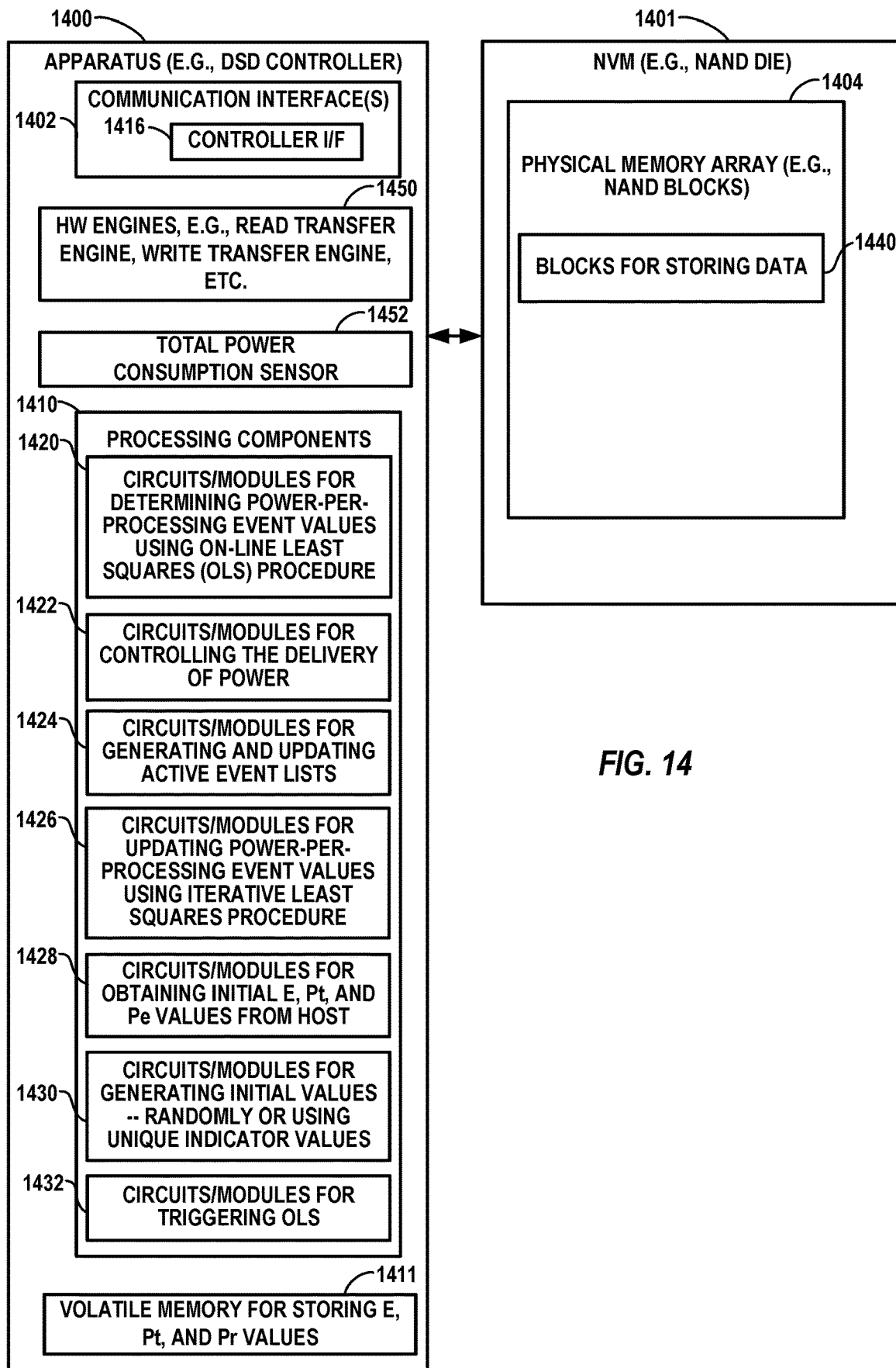
FIG. 14 is a schematic block diagram of an exemplary apparatus configured in accordance with some aspects of the disclosure, which includes components configured for determining power-per-processing event values and controlling power management.

FIG. 14 illustrates an embodiment of an exemplary data storage device or apparatus 1400 configured according to one or more aspects of the disclosure. The apparatus 1400, or components thereof, could embody or be implemented within a data storage controller such as a DSD controller coupled to a NAND die NVM 1401 or some other type of NVM array that supports data storage. In various implementations, the apparatus 1400, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 1400 includes a communication interface 1402 and is coupled to a NVM 1401 (e.g., a NAND die). The NVM 1401 includes physical memory array 1404. These components can be coupled to and/or placed in electrical communication with one another via suitable components, represented generally by the connection line in FIG. 14. Although not shown, other circuits such as timing sources, peripherals, voltage regulators, and power management circuits may be provided, which will not be described any further.

The communication interface 1402 of the apparatus 1400 provides a means for communicating with other apparatuses over a transmission medium. In some implementations, the communication interface 1402 includes circuitry and/or programming (e.g., a program) adapted to facilitate the communication of information bi-directionally with respect to one or more devices in a system. In some implementations, the communication interface 1402 may be configured for wire-based communication. For example, the communication interface 1402 could be a bus interface, a send/receive interface, or some other type of signal interface including circuitry for outputting and/or obtaining signals (e.g., outputting signal from and/or receiving signals into a DSD).

The physical memory array 1404 may include one or more NAND blocks 1440. The physical memory array 1404 may be accessed by the processing components 1410.

In one aspect, the apparatus 1400 may also include volatile memory 1411 such as a DDR for storing instructions and other information to support the operation of the processing components 1410, including storing E, Pt and Pe values (described above), active event lists, and any other information needed for performing OLS procedures.

In one aspect, the apparatus 1400 may include a set of HW engines or devices 1450, including, e.g., one or more of a Read transfer engine, a Write transfer engine, etc. (See above for a more complete list of exemplary device or engines.) The HW engines 1450 may be configured to perform operations or other processing events including, e.g., one or more of a Read transfer operation, a Write transfer operation, etc. In some aspects, each of the HW engines/devices 1450 may be different circuits/modules configured for performing different operations. In some aspects, some or all of the processing devices/engines 1450 and the processor components 1410 are components of an integrated circuit, such as an ASIC. For example, the various processing devices/engines 1450 may be different circuits or modules within the integrated circuit and the various processing components 1410 may be other circuits or modules within the same integrated circuit. In one aspect, the apparatus 1400 may also include a total power consumption sensor 1452 for measuring the total power of the set of HW engines 1450 (including any baseline power that may be consumed even when none of the HW engines 1450 is active).

The apparatus 1400 includes various processing components 1410 arranged or configured to obtain, process and/or send data, control data access and storage, issue or respond to commands, and control other desired operations. For example, the processing components 1410 may be implemented as one or more processors, one or more controllers, and/or other structures configured to perform functions. According to one or more aspects of the disclosure, the processing components 1410 may be adapted to perform any or all of the features, processes, functions, operations and/or routines described herein. For example, the processing components 1410 may be configured to perform any of the steps, functions, and/or processes described with respect to FIGS. 1-10. As used herein, the term "adapted" in relation to processing components 1410 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-10. The processing components 1410 serve as an example of a means for processing. In various implementations, the processing components 1410 may provide and/or incorporate, at least in part, functionality described above for the components of controller 108 of FIG. 1, processor 612 of FIG. 16, or controller 818 of FIG. 8.

According to at least one example of the apparatus 1400, the processing components 1410 may include one or more of: circuit/modules 1420 configured for determining power-per-processing event values using the OLS procedure described above; circuit/modules 1422 configured for controlling the delivery of power to the HW engines 1450 based on the power-per-processing event values; circuits/modules 1424 configured for generating and updating active event lists representative of particular HW engines active at any given time; circuits/modules 1426 configured for updating the power-per-processing event values using the iterative/recursive least-squares procedure described above; circuits/modules 1428 configured for obtaining initial E, Pt, and Pe values from host (for use in embodiments where an off-line OLS procedure is initially performed (as in FIG. 7); circuits/modules 1430 for generating initial values (e.g., for E, Pt, and Pe) by assigning randomly generated values or by using unique indicator values; and circuits/modules 1432 for triggering the OLS procedure (or the iterative/recursive OLS procedure) based, for example, on a change in device temperature or other factors. The physical memory array 1404 may include blocks 1440 for storing data, such as user data.

In at least some examples, means may be provided for performing the functions illustrated in FIG. 14 and/or other functions illustrated or described herein. For example, the means may include one or more of: means, such as circuits/modules 1420, for determining power-per-processing event values by, e.g., using the OLS procedure described above; means, such as circuits/modules 1422, for controlling the delivery of power to the HW engines 1450 based on the power-per-processing event values; means, such as circuits/modules 1424, for generating and updating active event lists representative of particular HW engines active at any given time; means, such as circuits/modules 1426, for updating the power-per-processing event values using the iterative/recursive least-squares procedure described above; means, such as circuits/modules 1428, for obtaining initial E, Pt, and Pe values from host (for use in embodiments where an off-line OLS procedure is initially performed (as in FIG. 7); means, such as circuits/modules 1430, for generating initial values (e.g., for E, Pt, and Pe) by assigning randomly generated values or by using unique indicator values; and means, such as circuits/modules 1432, for triggering the OLS procedure (or the iterative/recursive OLS procedure) based, for example, on a change in device temperature or other factors.

Still further, in some aspects, the power sensor 1452 provides a means for measuring a total power consumption of a plurality of processing devices. The circuits/modules 1420 provide a means for determining a power-per-processing event value for each of the plurality of processing devices based on total power consumption values obtained from the means for measuring the total power consumption. The circuits/modules 1422 provide a means for controlling delivery of power to the plurality of processing devices based on the power-per-processing event values.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, datastore, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
   a non-volatile memory (NVM);
   a plurality of processing devices configured to process NVM data;
   a power sensor configured to measure a total power consumption of the plurality of processing devices; and
   one or more processors configured, individually or in combination, to:
      measure a plurality of total power consumption values using the power sensor, with each of the plurality of total power consumption values measured at a different time;
      identify, for each total power consumption value of the plurality of total power consumption values, active processing devices of the plurality of processing devices that were active while a corresponding total power consumption value was measured;
      determine a power-per-processing event value for each of the plurality of processing devices based on the plurality of total power consumption values and the active processing devices by being further configured to determine a least-squares fit of the total power consumption values to a matrix product of the power-per-processing event values and the corresponding active processing devices, wherein each power-per-processing event value is an estimated power consumption of a corresponding one of the processing devices for a corresponding processing event; and control delivery of power to the plurality of processing devices based on the power-per-processing event values.

2. The data storage device of claim 1, wherein the plurality of processing devices comprises a read transfer engine and a write transfer engine and wherein the power-per-processing event values comprise a power-per-read transfer event and a power-per-write transfer event.

3. The data storage device of claim 1, wherein the one or more processors are further configured, individually or in combination, to:

store the plurality of total power consumption values as a power measurement vector (Pt);

for each of the total power consumption values, store indications of the active processing devices operating while the corresponding total power consumption value was measured in a corresponding row of a matrix (E), wherein a first column of the matrix (E) stores a value indicative of a baseline power; and determine the power-per-processing event values by performing a least-squares procedure on the matrix (E) and the power measurement vector (Pt) to determine an estimated power consumption vector (Pe), wherein E·Pe=Pt and wherein each value within the estimated power consumption vector (Pe) represents the estimated power consumption of a corresponding one of the processing devices for a corresponding processing event.

4. The data storage device of claim 3, wherein the one or more processors are further configured, individually or in combination, to:

obtain an additional total power consumption value from the power sensor;

obtain indications of additional active processing devices operating while the additional total power consumption value was measured by the power sensor; and perform an iterative least-squares procedure to determine an updated estimated power consumption vector (Pe) using the additional total power consumption value and the additional active processing devices.

5. The data storage device of claim 3, wherein the one or more processors are further configured, individually or in combination, to use at least some initial values within at least one of the matrix (E), the power measurement vector (Pt), and the estimated power consumption vector (Pe) to determine preliminary estimated power consumption vector (Pe) values.

6. The data storage device of claim 5, wherein the one or more processors are further configured, individually or in combination, to obtain the initial values by: (a) receiving the initial values from a host device, (b) randomly generating the initial values, and/or (c) assigning unique indicator values as the initial values.

7. The data storage device of claim 1, wherein the one or more processors are further configured, individually or in combination, to control the delivery of power to the plurality of processing devices based on the power-per-processing event values to correspond to a power budget.

8. The data storage device of claim 1, wherein the plurality of processing devices comprises a set of hardware processing devices.

9. The data storage device of claim 8, wherein the one or more processors and the set of hardware processing devices comprise components of an integrated circuit.

10. The data storage device of claim 1, wherein:

each of the plurality of processing devices is represented by a corresponding column of a matrix with an indicator in each row of the column; and the indicators are configured to identify which of the plurality of processing devices were active while a corresponding total power consumption value was measured.

11. A method for use by a data storage device including a non-volatile memory (NVM), a power sensor, and a plurality of processing devices configured to process NVM data, the method comprising:

measuring, using the power sensor, a plurality of total power consumption values, each representative of a total power consumed by the plurality of processing devices at a different time;

identifying, for each total power consumption value of the plurality of total power consumption values, active processing devices of the plurality of processing devices that were active while a corresponding total power consumption value was measured;

determining a power-per-processing event value for each of the plurality of processing devices based on the plurality of total power consumption values and the active processing devices by determining a least-squares fit of the total power consumption values to a matrix product of the power-per-processing event values and the corresponding active processing devices, wherein each power-per-processing event value is an estimated power consumption of a corresponding one of the processing devices for a corresponding processing event; and controlling delivery of power to the plurality of processing devices based on the power-per-processing event values.

12. The method of claim 11, further comprising:

storing the plurality of total power consumption values as a power measurement vector (Pt);

for each of the total power consumption values, storing indications of the active processing devices operating while the corresponding total power consumption value was measured in a corresponding row of a matrix (E), wherein a first column of the matrix (E) stores a value indicative of baseline power; and determining the power-per-processing event values by performing a least-squares procedure on the matrix (E) and the power measurement vector (Pt) to determine an estimated power consumption vector (Pe), wherein E·Pe=Pt, and wherein each value within the estimated power consumption vector (Pe) represents the estimated power consumption of a corresponding one of the processing devices for a corresponding processing event.

13. The method of claim 12, further comprising:

obtaining an additional total power consumption value from the power sensor;

obtaining indications of additional active processing devices operating while the additional total power consumption value was measured by the power sensor; and performing an iterative least-square procedure to determine an updated estimated power consumption vector (Pe) using the additional total power consumption value and the additional active processing devices.

14. The method of claim 12, further comprising using at least some initial values within at least one of the matrix (E), the power measurement vector (Pt), and the estimated power consumption vector (Pe) to determine preliminary estimated power consumption vector (Pe) values.

15. The method of claim 14, further comprising obtaining the initial values by: (a) receiving the initial values from a host device, (b) randomly generating the initial values, and/or (c) assigning unique indicator values as the initial values.

16. The method of claim 11, further comprising controlling the delivery of power to the plurality of processing devices based on the power-per-processing event values to correspond to a power budget.

17. The method of claim 11, wherein:
each of the plurality of processing devices is represented by a corresponding column of a matrix with an indicator in each row of the column; and
the indicators are configured to identify which of the plurality of processing devices were active while a corresponding total power consumption value was measured.

18. An apparatus for use with a non-volatile memory (NVM) and a plurality of processing devices configured to process NVM data, the apparatus comprising:
means for measuring a plurality of total power consumption values, each representative of a total power consumed by the plurality of processing devices at a different time;
means for identifying, for each total power consumption value of the plurality of total power consumption values, active processing devices of the plurality of processing devices that were active while a corresponding total power consumption value was measured;
means for determining a power-per-processing event value for each of the plurality of processing devices based on the plurality of total power consumption values and the active processing devices by determining a least-squares fit of the total power consumption values to a matrix product of the power-per-processing event values and the corresponding active processing devices, wherein each power-per-processing event value is an estimated power consumption of a corresponding one of the processing devices for a corresponding processing event; and
means for controlling delivery of power to the plurality of processing devices based on the power-per-processing event values.

19. The apparatus of claim 18, wherein:
each of the plurality of processing devices is represented by a corresponding column of a matrix with an indicator in each row of the column; and
the indicators are configured to identify which of the plurality of processing devices were active while a corresponding total power consumption value was measured.

20. A data storage device, comprising:
a non-volatile memory (NVM);
a plurality of processing devices configured to process NVM data;
a power sensor configured to measure a total power consumption of the plurality of processing devices; and
one or more processors configured, individually or in combination, to:
measure a plurality of total power consumption values using the power sensor, with each of the plurality of total power consumption values measured at a different time;
identify, for each total power consumption value of the plurality of total power consumption values, active processing devices of the plurality of processing devices that were active while a corresponding total power consumption value was measured;
determine a power-per-processing event value for each of the plurality of processing devices based on the plurality of total power consumption values and the active processing devices by being further configured to fit the total power consumption values to a matrix product of the power-per-processing event values and the corresponding active processing devices, wherein:
each power-per-processing event value is an estimated power consumption of a corresponding one of the processing devices for a corresponding processing event,
each of the plurality of processing devices is represented by a corresponding column of a matrix with an indicator in each row of the column, and
the indicators are configured to identify which of the plurality of processing devices were active while a corresponding total power consumption value was measured; and
control delivery of power to the plurality of processing devices based on the power-per-processing event values.

21. A method for use by a data storage device including a non-volatile memory (NVM), a power sensor, and a plurality of processing devices configured to process NVM data, the method comprising:
measuring, using the power sensor, a plurality of total power consumption values, each representative of a total power consumed by the plurality of processing devices at a different time;
identifying, for each total power consumption value of the plurality of total power consumption values, active processing devices of the plurality of processing devices that were active while a corresponding total power consumption value was measured;
determining a power-per-processing event value for each of the plurality of processing devices based on the plurality of total power consumption values and the active processing devices by fitting the total power consumption values to a matrix product of the power-per-processing event values and the corresponding active processing devices, wherein:
each power-per-processing event value is an estimated power consumption of a corresponding one of the processing devices for a corresponding processing event,
each of the plurality of processing devices is represented by a corresponding column of a matrix with an indicator in each row of the column, and
the indicators are configured to identify which of the plurality of processing devices were active while a corresponding total power consumption value was measured; and controlling delivery of power to the plurality of processing devices based on the power-per-processing event values.

* * * * *